United States Patent
Kozuka et al.

(10) Patent No.: US 12,476,071 B2
(45) Date of Patent: Nov. 18, 2025

(54) SPECIMEN MACHINING DEVICE AND SPECIMEN MACHINING METHOD

(71) Applicant: JEOL Ltd., Tokyo (JP)

(72) Inventors: Munehiro Kozuka, Tokyo (JP);
Tsutomu Negishi, Tokyo (JP);
Tatsuhito Kimura, Tokyo (JP);
Yoshikazu Ishikawa, Tokyo (JP);
Hisashi Kawahara, Tokyo (JP)

(73) Assignee: JEOL Ltd., Tokyo (JP)

( * ) Notice: Subject to any disclaimer, the term of this patent is extended or adjusted under 35 U.S.C. 154(b) by 333 days.

(21) Appl. No.: 17/832,054

(22) Filed: Jun. 3, 2022

(65) Prior Publication Data
US 2022/0392739 A1 Dec. 8, 2022

(30) Foreign Application Priority Data
Jun. 4, 2021 (JP) ................ 2021-094687

(51) Int. Cl.
*H01J 37/22* (2006.01)
*H01J 37/08* (2006.01)
(Continued)

(52) U.S. Cl.
CPC ........... *H01J 37/222* (2013.01); *H01J 37/08* (2013.01); *H01J 37/09* (2013.01); *H01J 37/20* (2013.01);
(Continued)

(58) Field of Classification Search
None
See application file for complete search history.

(56) References Cited

U.S. PATENT DOCUMENTS 5,656,811 A 8/1997 Itoh et al.
2006/0255295 A1* 11/2006 Yoshioka ................ G01N 1/32
250/492.21
(Continued)

FOREIGN PATENT DOCUMENTS

JP 2001203424 A * 7/2001
JP 3221797 B2 * 10/2001 ............ H01J 37/304
(Continued)

OTHER PUBLICATIONS

Extended European Search Report issued in EP22176775.9 on Oct. 14, 2022.

*Primary Examiner* — Andrew Smyth
(74) *Attorney, Agent, or Firm* — The Webb Law Firm

(57) ABSTRACT

A specimen machining device for machining a specimen by irradiating the specimen with an ion beam includes an ion source for irradiating the specimen with the ion beam, a shielding member disposed on the specimen to block the ion beam, a specimen stage for holding the specimen, a camera for photographing the specimen, a coaxial illumination device for irradiating the specimen with illumination light along an optical axis of the camera, and a processing unit for determining whether to terminate the machining based on an image photographed by the camera. The processing unit performs processing for acquiring information indicating a target machined width, processing for acquiring the image, processing for measuring a machined width on the acquired image, and processing for terminating the machining when the measured machined width equals or exceeds the target machined width.

9 Claims, 20 Drawing Sheets

(51) Int. Cl.
  *H01J 37/09*    (2006.01)
  *H01J 37/20*    (2006.01)
  *H01J 37/244*   (2006.01)
  *H01J 37/305*   (2006.01)
  *H01L 21/66*    (2006.01)

(52) U.S. Cl.
  CPC .......... *H01J 37/226* (2013.01); *H01J 37/244* (2013.01); *H01J 37/305* (2013.01); *H01L 22/26* (2013.01); H01J 2237/20207 (2013.01); H01J 2237/24578 (2013.01); H01J 2237/31745 (2013.01)

(56) References Cited

U.S. PATENT DOCUMENTS

2008/0283778 A1   11/2008   Tomimatsu et al.
2012/0006786 A1   1/2012    Boguslavsky et al.

FOREIGN PATENT DOCUMENTS

JP     2012193962 A    10/2012
KR     20180074574 A * 7/2018  ............. H01L 22/12

* cited by examiner

BRIGHTNESS PROFILE

SPECIMEN MACHINING DEVICE AND SPECIMEN MACHINING METHOD

CROSS-REFERENCE TO RELATED APPLICATION

This application claims priority to Japanese Patent Application No. 2021-094687 filed Jun. 4, 2021, the disclosure of which is hereby incorporated by reference in its entirety.

BACKGROUND OF THE INVENTION

Field of the Invention

The present invention relates to a specimen machining device and a specimen machining method.

Description of Related Art

A Cross Section Polisher (registered trademark) for machining a cross-section of a specimen, an Ion Slicer (registered trademark) for preparing a thin film specimen, and so on are available as specimen machining devices for machining a specimen using an ion beam.

For example, JP-A-2012-193962 discloses a specimen preparation device for preparing a thin film specimen for use in a transmission electron microscope by disposing a shield belt on a bulk specimen, irradiating the specimen with an ion beam through the shield belt, and ion milling the part not shielded by the shield belt.

In JP-A-2012-193962, an etched cross-section of the specimen is photographed by a CCD camera, and an ion milling completion determination circuit monitors change in the shape of the specimen. When the ion milling completion determination circuit detects that a through hole has opened in the specimen, emission of the ion beam is stopped.

In this type of specimen machining device, a two-stage milling method is known as a method for preparing a specimen used to observe a structure such as wiring or a transistor, for example, formed on a wafer front surface from a cross-section direction. In the two-stage milling method, primary milling is performed to reduce the overall thickness of the specimen, and secondary milling is performed to reduce the thickness to a point at which the wafer front surface, on which the structure serving as the observation target is formed, can be observed under a transmission electron microscope.

In the primary milling, the specimen is disposed under the shield belt and the ion beam is emitted from the wafer front surface side. In the secondary milling, the specimen is turned upside down and the ion beam is emitted from the wafer rear surface side. At this time, the ion beam is emitted directly onto the specimen, without using the shield belt. As a result, the specimen gradually becomes thinner from the wafer front surface side. In the secondary milling, machining is performed until the target structure reaches a thickness at which observation thereof under a transmission electron microscope becomes possible.

By performing primary milling and secondary milling in this manner, it is possible to prepare a specimen that can be subjected to cross-sectional observation.

In the primary milling, the machining must be stopped at a desired machined width. It is therefore necessary to configure the specimen machining device so that the machined width can be measured accurately and the timing at which to terminate the machining can be determined accurately.

SUMMARY OF THE INVENTION

According to a first aspect of the invention, there is provided a specimen machining device for machining a specimen by irradiating the specimen with an ion beam, the specimen machining device including:

an ion source for irradiating the specimen with the ion beam;

a shielding member disposed on the specimen to block the ion beam;

a specimen stage for holding the specimen;

a camera for photographing the specimen;

a coaxial illumination device for irradiating the specimen with illumination light along an optical axis of the camera; and a processing unit for determining whether to terminate the machining based on an image photographed by the camera, the processing unit performing processing for:

acquiring information indicating a target machined width;
acquiring the image;
measuring a machined width on the acquired image; and
terminating the machining when the measured machined width equals or exceeds the target machined width.

According to a second aspect of the invention, there is provided a specimen machining method using a specimen machining device for machining a specimen by irradiating the specimen with an ion beam, the specimen machining method including:

acquiring information indicating a target machined width;
acquiring an image of the specimen by illuminating the specimen using coaxial illumination and photographing the specimen;
measuring a machined width on the acquired image; and
terminating the machining when the measured machined width equals or exceeds the target machined width.

DESCRIPTION OF THE INVENTION

According to an embodiment of the invention, there is provided a specimen machining device for machining a specimen by irradiating the specimen with an ion beam, the specimen machining device including:
an ion source for irradiating the specimen with the ion beam;
a shielding member disposed on the specimen to block the ion beam;
a specimen stage for holding the specimen;
a camera for photographing the specimen;
a coaxial illumination device for irradiating the specimen with illumination light along an optical axis of the camera; and
a processing unit for determining whether to terminate the machining based on an image photographed by the camera, the processing unit performing processing for:
acquiring information indicating a target machined width;
acquiring the image;
measuring a machined width on the acquired image; and
terminating the machining when the measured machined width equals or exceeds the target machined width.

With this specimen machining device, the specimen is illuminated by coaxial illumination, and therefore inclined surfaces sandwiching a machined region can easily be specified on the image. As a result, with this specimen machining device, the machined width can be measured accurately, and the timing at which to terminate the machining can be determined accurately based on the machined width.

According to an embodiment of the invention, there is provided a specimen machining method using a specimen machining device for machining a specimen by irradiating the specimen with an ion beam, the specimen machining method including:
acquiring information indicating a target machined width;
acquiring an image of the specimen by illuminating the specimen using coaxial illumination and photographing the specimen;
measuring a machined width on the acquired image; and
terminating the machining when the measured machined width equals or exceeds the target machined width.

With this specimen machining method, the specimen is illuminated by coaxial illumination, and therefore inclined surfaces sandwiching a machined region can easily be specified on the image. As a result, with this specimen machining method, the machined width can be measured accurately, and the timing at which to terminate the machining can be determined accurately based on the machined width.

Preferred embodiments of the invention are described in detail below with reference to the drawings. It is noted that the following embodiments do not unduly limit the scope of the invention as stated in the claims. In addition, all of the components described in the following embodiments are not necessarily essential requirements of the invention.

1. SPECIMEN MACHINING DEVICE

Figure 1:
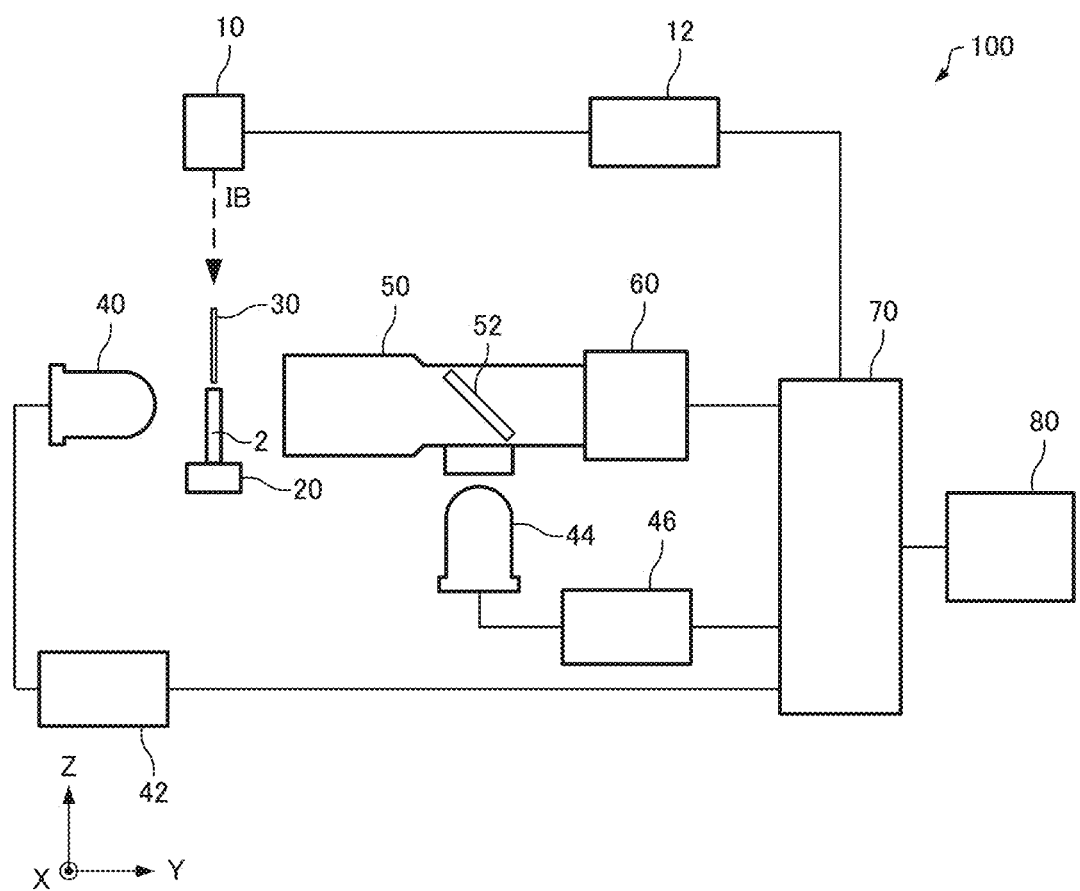
FIG. 1 is a diagram illustrating a configuration of a specimen machining device according to an embodiment of the invention.

First, a specimen machining device according to an embodiment of the invention will be described with reference to the figures. FIG. 1 is a diagram illustrating a configuration of a specimen machining device 100 according to this embodiment. FIG. 1 illustrates an X axis, a Y axis, and a Z axis as three mutually orthogonal axes.

The specimen machining device 100 is a device for preparing a specimen used for observation or analysis by irradiating a specimen 2 with an ion beam IB in order to machine the specimen 2. With the specimen machining device 100, it is possible to prepare a thin film specimen that can be observed under a transmission electron microscope.

As illustrated in FIG. 1, the specimen machining device 100 includes an ion source 10, a control circuit 12, a specimen stage 20, a shielding member 30, a transmission illumination device 40, an illumination dimming circuit 42, a coaxial illumination device 44, an illumination dimming circuit 46, an optical system 50, a camera 60, an information processing device 70 (an example of a processing unit), and a display unit 80.

The ion source 10 irradiates the specimen 2 with the ion beam IB. The ion source 10 is attached to an upper portion of a chamber, not shown in the figures, so as to emit the ion beam IB onto the specimen 2 housed in the chamber. The interior of the chamber is in a vacuum state. For example, the ion source 10 is an ion gun that emits the ion beam IB by accelerating ions at a predetermined acceleration voltage. The ion source 10 emits the ion beam IB along the Z axis. When irradiating the specimen 2 with the ion beam IB, the ion source 10 swings using a parallel axis to the X axis as a rotation axis, for example. The ion source 10 is controlled by the control circuit 12.

The specimen stage 20 holds the specimen 2. The shielding member 30 is attached to the specimen stage 20. The shielding member 30 is disposed on the specimen 2. The thickness of the shielding member 30 is approximately 10 μm, for example, while the thickness of the specimen 2 prior to machining is approximately 100 μm, for example. The shielding member 30 is disposed in the center of the specimen 2 in a thickness direction.

The specimen stage 20 includes a swing mechanism for swinging the specimen 2 and the shielding member 30. The swing mechanism tilts the specimen 2 and the shielding member 30 using a swing axis (a tilt axis) as a rotation axis. The swing axis is parallel to the Y axis, for example. The swing mechanism swings the specimen 2 and the shielding member 30 in a fixed period, for example.

The specimen 2 held on the specimen stage 20 is plate shaped. The specimen 2 is a rectangular parallelepiped, for example. The specimen 2 will be described below.

The shielding member 30 blocks the ion beam IB. The ion beam IB discharged from the ion source 10 is emitted onto the specimen 2 through the shielding member 30. The shielding member 30 is belt shaped, for example. The shielding member 30 is a shield belt, for example. The shielding member 30 is formed from a material that is not easily milled by the ion beam IB, for example. The shielding member 30 is positioned above the specimen 2 (in a +Z direction).

The transmission illumination device 40 emits illumination light that transmissively illuminates the specimen 2. More specifically, the transmission illumination device 40 emits the illumination light from the back of the specimen 2. The strength of the illumination light emitted by the transmission illumination device 40 is controlled by the illumination dimming circuit 42.

The transmission illumination device 40, the specimen 2, the optical system 50, and the camera 60 are arranged in that order along the Y axis.

The coaxial illumination device 44 emits illumination light for illuminating the specimen 2 by means of coaxial illumination. More specifically, the coaxial illumination device 44 irradiates the specimen 2 with illumination light along the optical axis of the camera 60. In the example in the figure, the optical system 50 includes a half mirror 52, and using the half mirror 52, the optical axis of the illumination light is aligned with the optical axis of the camera 60. The strength of the illumination light emitted by the coaxial illumination device 44 is controlled by the illumination dimming circuit 46.

The camera 60 photographs the specimen 2 and the shielding member 30 through the optical system 50. The camera 60 is a digital camera such as a CCD camera or a CMOS camera, for example. The optical system 50 is an optical system through which the camera 60 photographs the specimen 2.

The information processing device 70 performs processing for acquiring an image photographed by the camera 60 and displaying the photographed image on the display unit 80. The information processing device 70 also performs processing for acquiring an image photographed by the camera 60 and determining whether to terminate the machining based on the image. Furthermore, the information processing device 70 controls the ion source 10 via the control circuit 12.

The information processing device 70 is a personal computer (PC) or the like, for example, which includes a processor such as a CPU (Central Processing Unit), a storage device (a memory) such as a RAM (Random Access Memory) and a ROM (Read Only Memory), and an operation unit. The storage device stores programs and data used to perform various types of image processing and control processing. The functions of the information processing device 70 (the processing unit) can be realized by having the processor execute the programs. The operation unit is used by the user to input operation information, and the operation unit outputs the input operation information to the processor. The functions of the operation unit can be realized by hardware such as a keyboard, a mouse, a button, or a touch panel, for example.

The display unit 80 displays the images acquired by the information processing device 70 and images generated by the information processing device 70. The functions of the display unit 80 can be realized by an LCD, a CRT, a touch panel that also functions as the operation unit, and so on.

2. OPERATION OF SPECIMEN MACHINING DEVICE 2.1. Two-Stage Milling Method

The two-stage milling method is a method for preparing a specimen that is used to observe, from a cross-section direction, a thin film formed on a substrate, a laminated film which is formed on a substrate and on which wiring, a transistor, and so on are formed, or the like, for example. In the two-stage milling method, primary milling is performed to reduce the overall thickness of the specimen, and secondary milling is performed to reduce the thickness of the thin film or laminated film serving as a machining subject to a thickness enabling observation thereof under a transmission electron microscope.

2.2. Primary Milling

Figure 2:
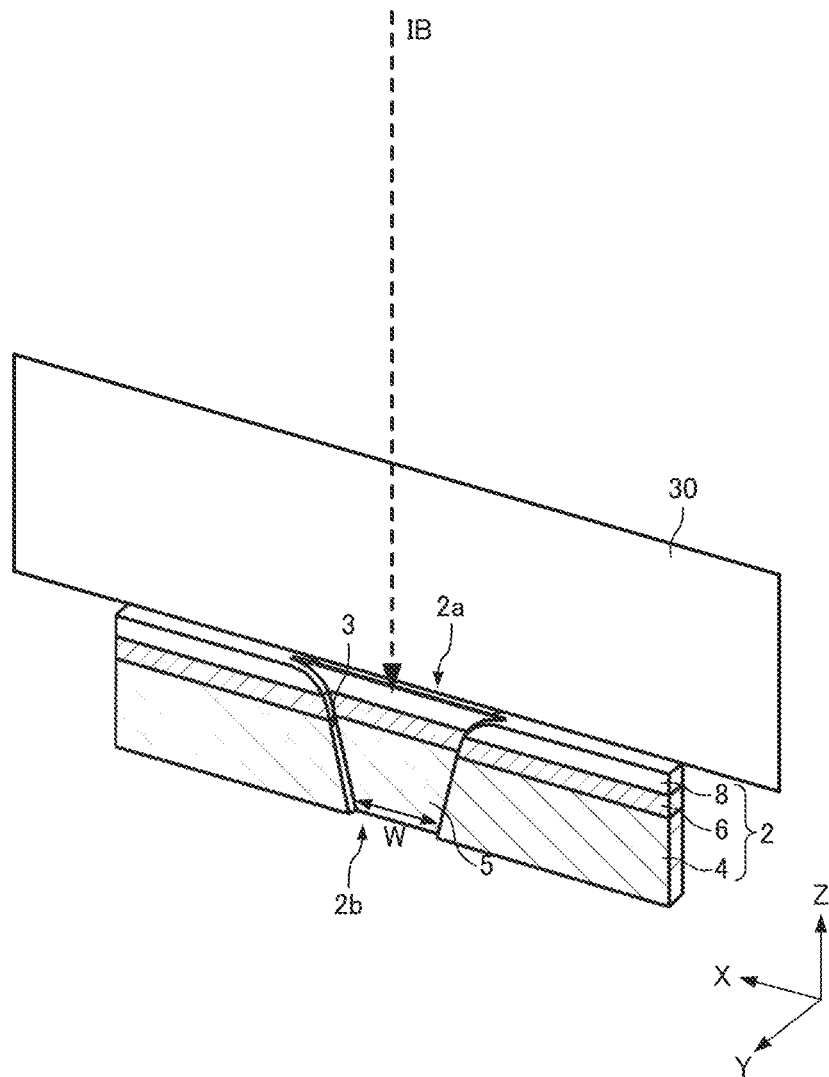
FIG. 2 illustrates primary milling.
Figure 3:
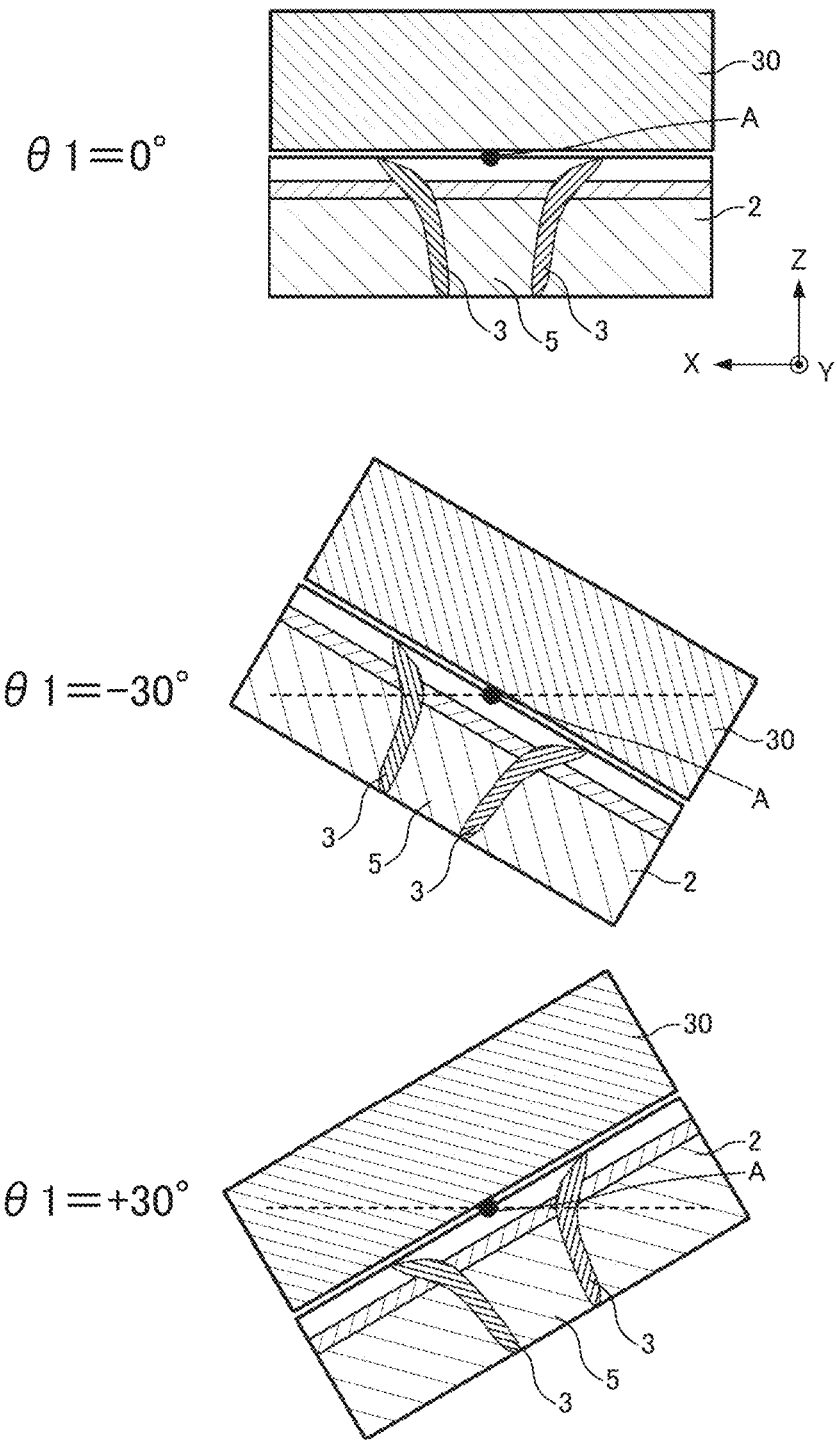
FIG. 3 illustrates primary milling.
Figure 4:
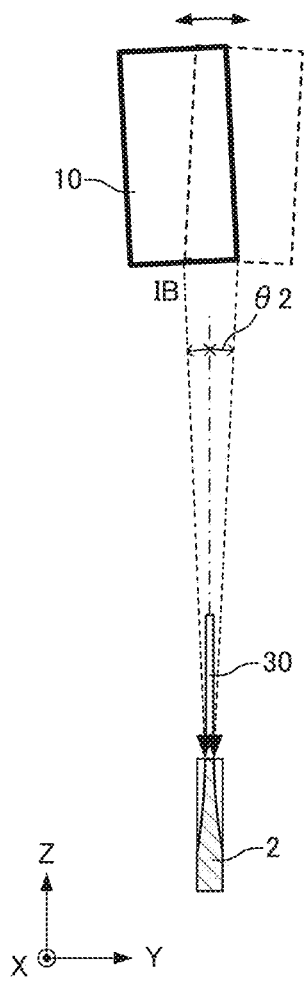
FIG. 4 illustrates primary milling.

FIGS. 2 to 4 illustrate the primary milling. FIG. 2 is a schematic perspective view illustrating the specimen 2 and the shielding member 30. FIG. 3 illustrates the swinging operation of the specimen 2. FIG. 4 illustrates the operation of the ion source 10.

As illustrated in FIG. 2, the specimen 2 includes a substrate 4, a laminated film 6, and a protective member 8. The substrate 4 is a semiconductor substrate such as a silicon substrate or a compound substrate, for example. The laminated film 6 includes wiring, a transistor, and so on, and is formed on the substrate 4 by a semiconductor manufacturing technique, for example. In the example in the figure, a specimen that is used with a transmission electron microscope to observe the cross-section of the laminated film 6 formed on the substrate 4 can be prepared. The protective member 8 is a member for protecting the laminated film 6 during machining, and is constituted by a glass substrate, for example. The protective member 8 is adhered to the laminated film 6 by epoxy resin or the like. The thickness of the protective member 8 is approximately 100 μm, for example.

The specimen 2 is machined into a plate shape in advance so that the height (the Z direction size) thereof is from 500 to 800 μm and the width (the Y direction size) thereof is approximately 100 μm.

Note that the configuration of the specimen 2 is not limited to the example illustrated in FIG. 2, and specimens having various configurations can be machined so as to be observable by a transmission electron microscope using the two-stage milling method.

In the primary milling, the specimen 2 is disposed so that a first end portion 2a of the specimen 2 faces upward and a second end portion 2b of the specimen 2 faces downward. The first end portion 2a of the specimen 2 is the end portion of the specimen 2 on the protective member 8 side, and the second end portion 2b of the specimen 2 is the end portion of the specimen 2 on the substrate 4 side. The specimen 2 is disposed under the shielding member 30 so as to be irradiated by the ion beam IB from the first end portion 2a side of the specimen 2. The ion beam IB is emitted onto the specimen 2 through the shielding member 30.

As illustrated in FIG. 3, when the specimen 2 is machined by being irradiated with the ion beam IB, the swing mechanism of the specimen stage 20 is operated so as to swing the specimen 2 and the shielding member 30 using an axis A as the rotation axis. In other words, the swing mechanism of the specimen stage 20 causes the specimen 2 and the shielding member 30 to perform a reciprocating tilting (rotary) motion using the axis A as the tilting axis (the rotation axis). The axis A is parallel to the Y axis, for example. The axis A is positioned on a boundary between the specimen 2 and the shielding member 30, for example.

Note that FIG. 3 illustrates a point at which a tilt angle θ1 of the specimen 2 is 0°, a point at which the tilt angle θ1 of the specimen 2 is −30°, and a point at which the tilt angle θ1 of the specimen 2 is +30°. Note that in FIG. 3, the tilt angle θ1 is expressed as θ1=0° when the specimen 2 is parallel to the X axis, and expressed using "+" for counterclockwise and "−" for clockwise.

During machining of the specimen 2, as illustrated in FIG. 4, the ion source 10 is also swung. For example, the ion source 10 is tilted within a predetermined angle range relative to the Z axis. By swinging the ion source 10, the ion beam IB can be emitted from an oblique direction relative to a machining surface of the specimen 2. The ion source 10 is tilted so that an angle of incidence at which the ion beam IB becomes incident on the machining surface of the specimen 2 is approximately 0.4°, for example. In other words, the range of a tilt angle θ2 of the ion source 10 is from −0.4° to +0.4°. The tilt angle θ2 of the ion source 10 can be modified as appropriate in accordance with the material of the specimen 2 and so on, for example.

Thus, in the specimen machining device 100, machining is performed on the specimen 2 by irradiating the specimen 2 with the ion beam IB while swinging the specimen 2 and swinging the ion source 10. In the primary milling, two inclined surfaces 3 and a machined region 5 between the two inclined surfaces 3 are formed as a result of the machining. In the primary milling, machining is performed so that the entire machined region 5 reaches a substantially identical thickness to the thickness of the shielding member 30. Note that in the primary milling, machining may be performed so that the machined region 5 has a substantially identical thickness to the shielding member 30 and the film thickness thereof increases steadily from the first end portion 2a toward the second end portion 2b.

In the primary milling, the machining is terminated when the second end portion 2b of the specimen 2 reaches a suitable thickness for the secondary milling. In the secondary milling, as will be described below, the specimen 2 is disposed so that the second end portion 2b faces upward and the first end portion 2a faces downward, whereupon the ion beam IB is emitted from the second end portion 2b side. Hence, when the thickness of the specimen 2 on the second end portion 2b side is large, for example, the amount of the ion beam IB emitted onto the second end portion 2b side increases such that the second end portion 2b side is shaved rapidly. As a result, the specimen 2 may disappear before the laminated film 6 serving as the target is reduced in thickness. It is therefore necessary to set the second end portion 2b of the specimen 2 at a suitable thickness for the secondary milling during the primary milling.

Here, the thickness of the second end portion 2b of the specimen 2 cannot be confirmed from the image photographed by the camera 60. Therefore, a timing at which to terminate the machining of the primary milling is determined using the width of the machined region 5 on the second end portion 2b side of the specimen 2, or in other words a machined width W illustrated in FIG. 2, as a guide. In the specimen machining device 100, the machined region 5 of the specimen 2 becomes thinner and the machined width W increases as the machining progresses. Therefore, the thickness of the machined region 5 can be estimated from the machined width W.

For example, by setting the machined width W at approximately from 300 to 600 μm, the thickness of the second end portion 2b of the specimen 2 can be set at approximately 10 μm, which is a suitable thickness for the secondary milling.

The camera 60 photographs the specimen 2 during the machining. Images of the specimen 2 photographed by the camera 60 are transmitted to the information processing device 70. The information processing device 70 acquires the images photographed by the camera 60 and displays the acquired images on the display unit 80.

Figure 5:
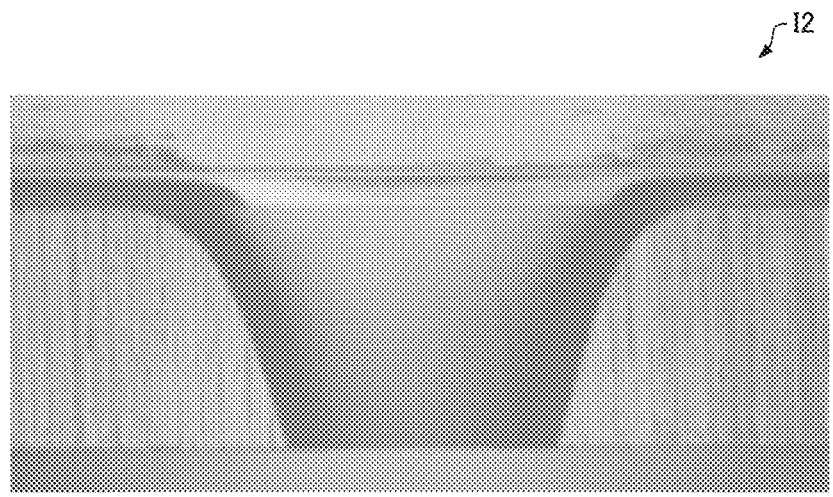
FIG. 5 illustrates an example of an image photographed by a camera.

FIG. 5 illustrates an example of an image I2 photographed by the camera 60. The image I2 illustrated in FIG. 5 is an image acquired by photographing the specimen 2 using the camera 60 when the specimen 2 is illuminated by coaxial illumination and transmission illumination.

The specimen 2 is illuminated by coaxial illumination, and therefore, on the image I2, as illustrated in FIG. 5, the machined region 5 of the specimen 2, an unmachined region of the specimen 2, and the shielding member 30 are light, while the inclined surfaces 3 are dark. The reason for this is that under coaxial illumination, the illumination light is reflected toward the camera 60 only by surfaces that are perpendicular to the observation direction (the optical axis of the camera 60). The inclined surfaces 3 are not perpendicular to the observation direction, and therefore the illumination light reflected by the inclined surfaces 3 does not travel toward the camera 60. Hence, on the image I2, the inclined surfaces 3 are dark. With the specimen machining device 100, the orientations of the surfaces of the respective regions of the specimen 2 do not change even when the specimen 2 is swung. By performing coaxial illumination, therefore, an image on which the inclined surfaces 3 are dark is acquired at all times, even when the specimen 2 is swung during the machining.

The specimen 2 is also illuminated by transmission illumination, and therefore, as illustrated in FIG. 5, the illumination light leaks through a gap between the specimen 2 and the shielding member 30. The illumination light also intrudes from below the specimen 2. Hence, on the image I2, the gap between the specimen 2 and the shielding member 30 and the space below the specimen 2 are light. As a result, on the image I2, only the inclined surfaces 3 are dark.

In the information processing device 70, the two inclined surfaces 3 are extracted from the image I2 using the fact that only the two inclined surfaces 3 are dark, and the machined width W is measured by measuring the distance between the two extracted inclined surfaces 3.

2.3. Secondary Milling

Figure 6:
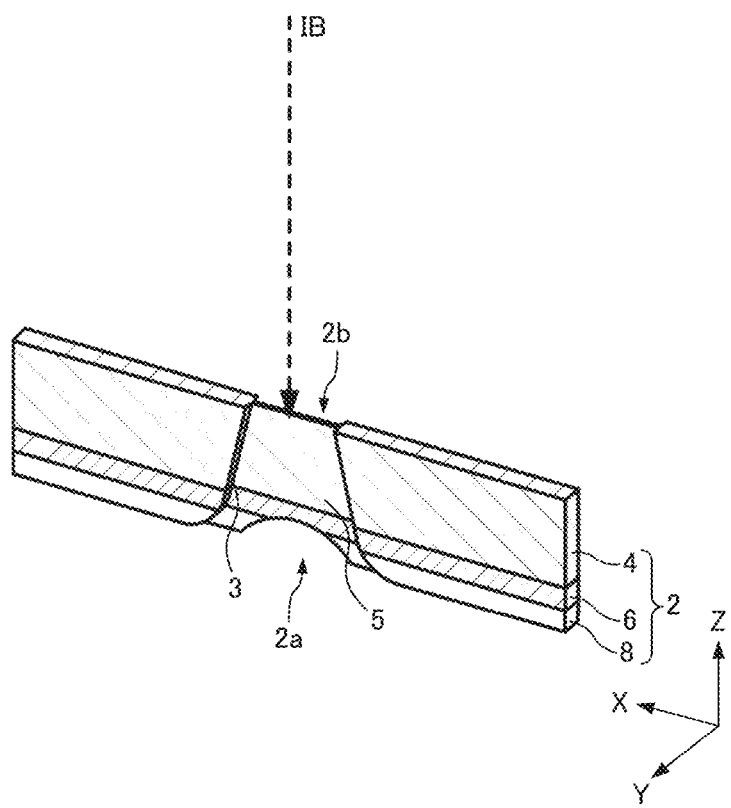
FIG. 6 illustrates secondary milling.

FIG. 6 illustrates the secondary milling.

As illustrated in FIG. 6, in the secondary milling, the specimen 2 is disposed so that the second end portion 2b of the specimen 2 faces upward and the first end portion 2a of the specimen 2 faces downward. In the secondary milling, the ion beam IB is emitted from the second end portion 2b side of the specimen 2. In the secondary milling, the ion beam IB is emitted directly onto the specimen 2, without using the shielding member 30.

Figure 7:
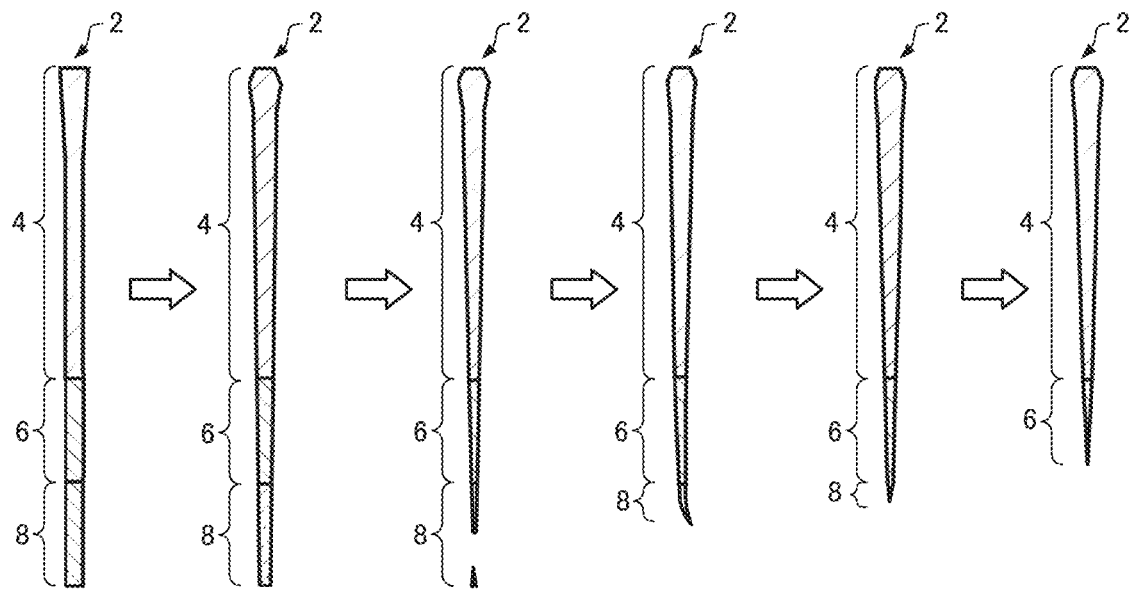
FIG. 7 is a schematic cross section illustrating a manner in which a specimen is machined during secondary milling.

FIG. 7 is a schematic cross section illustrating how the specimen 2 is machined during the secondary milling.

As illustrated in FIG. 7, in the secondary milling, first, the protective member 8 is reduced in thickness. During the process for reducing the thickness of the protective member 8, a hole may form in the protective member 8, and the protective member 8 may turn upward. When the protective member 8 is removed, a layer of epoxy resin, not shown in the figure, is reduced in thickness and removed, and finally, the target laminated film 6 is reduced in thickness.

3. SPECIMEN MACHINING METHOD

3.1. Preparation for Primary Milling
3.1.1. Setting of Specimen

As illustrated in FIGS. 1 and 2, the specimen 2 is set on the specimen stage 20 and the shielding member 30 is disposed on the specimen 2. The interior of the chamber is then evacuated. The specimen 2 and the shielding member 30 are then subjected to transmission illumination by the transmission illumination device 40 and coaxial illumination by the coaxial illumination device 44.

3.1.2. Noise Level Measurement

The noise level of the image I2 photographed by the camera 60 is measured. For example, the information processing device 70 measures the brightness in an identical location within the field of view of the camera 60 a plurality of times and sets a value acquired by subtracting the minimum brightness from the maximum brightness as the noise level. The noise level is thus quantified.

The noise level varies in accordance with the brightness of the illumination light, adjustments to the exposure time of the camera 60 and the gain of the camera 60, and so on, for example. When the noise level of the image I2 is high, the likelihood of making an erroneous determination in the processing for determining whether to terminate the machining increases.

The information processing device 70 displays the measured noise level on the display unit 80, and when the noise level is higher than a preset threshold, the information processing device 70 displays a notification on the display unit 80 in order to readjust the illumination conditions under which the transmission illumination device 40 and the coaxial illumination device 44 illuminate the specimen 2 and the settings of the camera 60.

Hence, in the specimen machining device 100, by measuring the noise level, the illumination conditions of the specimen 2 and the settings of the camera 60 can be set in an optimum state. As a result, an image I2 with little noise can be acquired, and the likelihood of making an erroneous determination in the processing for determining whether to terminate the machining can be reduced.

3.1.3. Specification of Position for Measuring Machined Width

Figure 8:
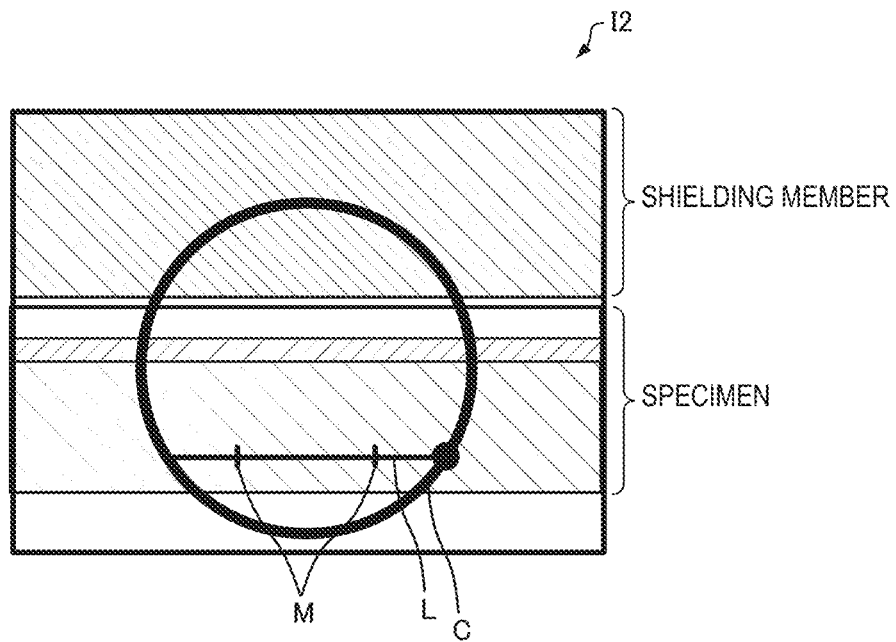
FIG. 8 schematically illustrates a cursor for specifying a position in which to measure a machined width.

The user specifies a position on the image I2 in which to measure the machined width W. FIG. 8 schematically illustrates a cursor C for specifying the position in which to measure the machined width W.

As illustrated in FIG. 8, the information processing device 70 displays the cursor C on the image I2 displayed on the display unit 80. The cursor C is used to specify a position on the image I2 in which to measure the machined width W. In the example in the figure, a line L is drawn on the cursor C, and the position indicated by the line L is set as the position in which to measure the machined width W. The user specifies the position in which to measure the machined width W using the cursor C by moving the cursor C via the operation unit of the information processing device 70.

3.1.4. Specification of Target Machined Width

The user specifies a target machined width TW. For example, the information processing device 70 displays a GUI (Graphical User Interface) screen on the display unit 80. The GUI screen includes a text box for inputting the target machined width TW, and when the user inputs the target machined width TW into the text box via the operation unit, information indicating the target machined width TW is input into the information processing device 70. As illustrated in FIG. 8, when the target machined width TW is input, a marker M corresponding to the target machined width TW is displayed on the line L. Note that the method for setting the target machined width TW is not limited to this method.

3.2. Primary Milling
3.2.1. Flow of Primary Milling

Figure 9:
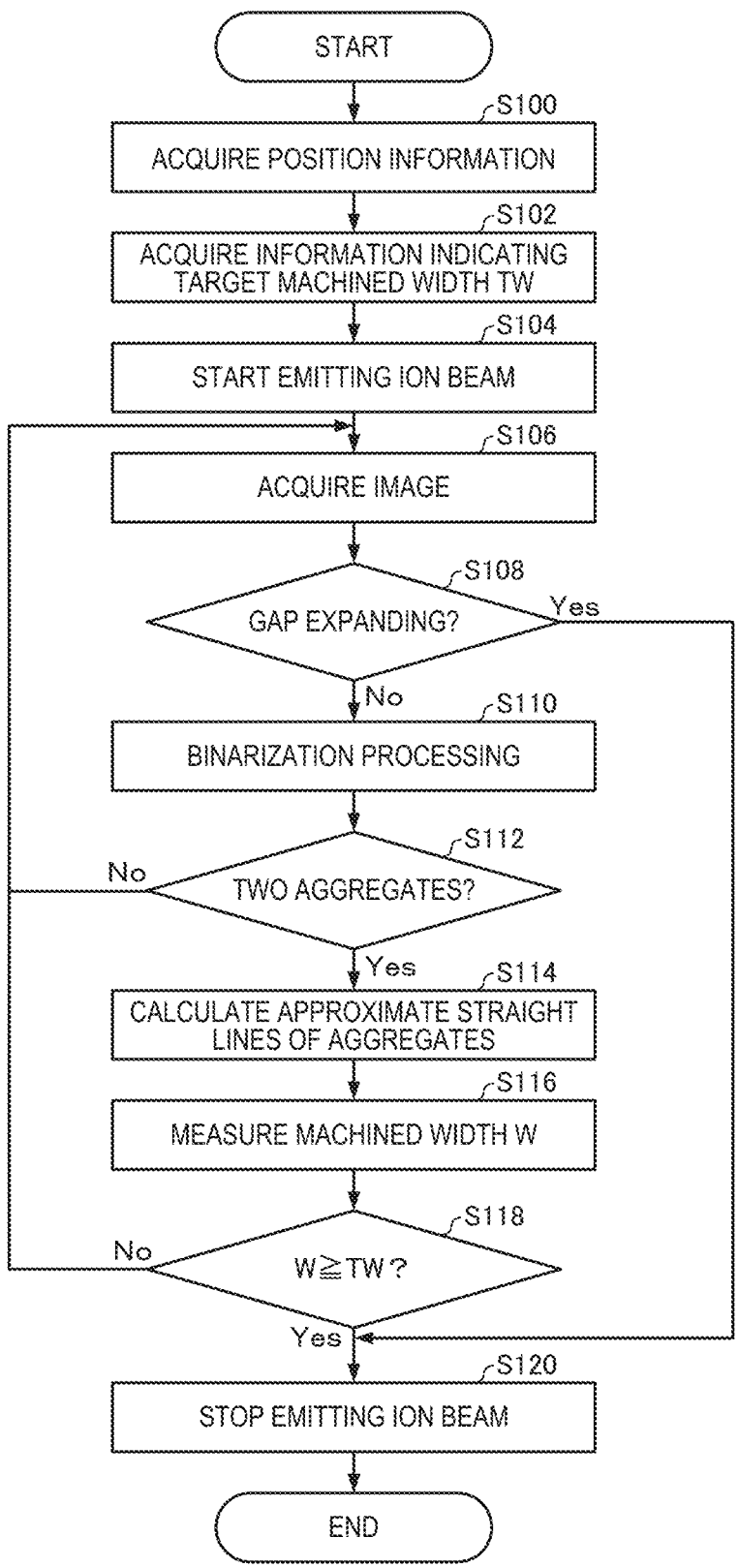
FIG. 9 is a flowchart illustrating an example of primary milling processing.

In the specimen machining device 100, the information processing device 70 performs primary milling processing for machining the specimen 2 by means of primary milling. FIG. 9 is a flowchart illustrating an example of the primary milling processing performed by the information processing device 70.

When the user inputs an instruction to start the primary milling into the information processing device 70, the information processing device 70 acquires information indicating the position in which to measure the machined width W (S100). The user can specify the position in which to measure the machined width W by moving the position of the cursor C via the operation unit. The information processing device 70 acquires the information indicating the position in which to measure the machined width W, specified using the cursor C, via the operation unit.

Further, the information processing device 70 acquires information indicating the target machined width TW (S102). The user can specify the target machined width TW by inputting a value of the target machined width TW via the operation unit. The information processing device 70 acquires the information indicating the input target machined width TW via the operation unit.

Next, the information processing device 70 performs processing for starting to emit the ion beam IB (S104). More specifically, the information processing device 70 generates a control signal for emitting the ion beam IB and transmits the generated control signal to the control circuit 12. The control circuit 12 generates a drive signal based on the control signal and outputs the drive signal to the ion source 10. As a result, the ion beam IB is emitted onto the specimen 2 from the ion source 10. At this time, the swing mechanism of the specimen stage 20 swings the specimen 2 and the shielding member 30.

In the specimen machining device 100, as described above, the specimen 2 is machined by emitting the ion beam IB onto the specimen 2 through the shielding member 30 while swinging the specimen 2 and the shielding member 30. While the specimen 2 is being machined, the camera 60 photographs the specimen 2.

When machining (emission of the ion beam IB) is started, the information processing device 70 acquires the image I2 of the specimen 2, photographed by the camera 60 (S106).

Figure 10:
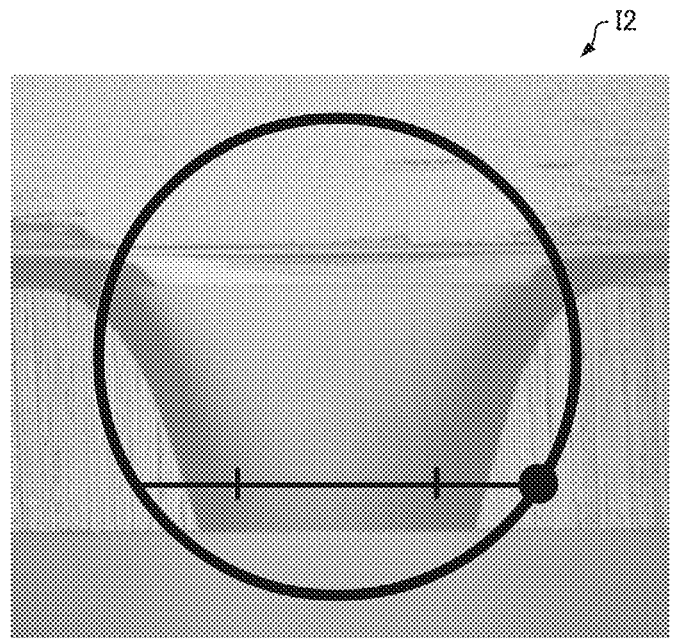
FIG. 10 schematically illustrates an image photographed by a camera.

FIG. 10 schematically illustrates the image I2 photographed by the camera 60.

As illustrated in FIG. 10, the information processing device 70 acquires the image I2 photographed by the camera 60 at a point where the specimen 2 is horizontal. In so doing, the tilt of the specimen 2 does not have to be taken into account during image processing to be described below. Further, the information processing device 70 acquires the image I2 once during a single period of the swinging operation of the specimen 2.

For example, in the example illustrated in FIG. 3, when the image I2 is photographed while the specimen 2 is horizontal (tilt angle θ1=0°) after tilting the specimen 2 to tilt angle θ1=−30° and when the image I2 is photographed while the specimen 2 is horizontal (tilt angle θ1=) 0° after tilting the specimen 2 to tilt angle θ1=+30°, a difference may occur between the resulting photographed images due to mechanical operation backlash of the swing mechanism. By acquiring the image I2 once during a single period of the swinging operation of the specimen 2, as described above, the difference between the images due to operation backlash can be reduced.

Next, the information processing device 70 measures the size of the gap between the specimen 2 and the shielding member 30 and determines whether or not the gap is expanding (S108). Note that the processing S108 for determining whether or not the gap is expanding will be described in detail below in "3.2.2 Processing for determining whether or not gap is expanding".

Having determined that the gap is expanding (Yes in S108), the information processing device 70 halts emission of the ion beam IB and terminates the processing (S120).

The information processing device 70 generates a control signal for stopping emission of the ion beam IB and transmits the generated control signal to the control circuit 12. The control circuit 12 stops outputting the drive signal based on the control signal. As a result, emission of the ion beam IB by the ion source 10 is stopped. At this time, the information processing device 70 may display a notification indicating that the machining was not progressing normally on the display unit 80.

Having determined that the gap is not expanding (No in S108), the information processing device 70 measures the machined width W on the image I2.

Figure 11:
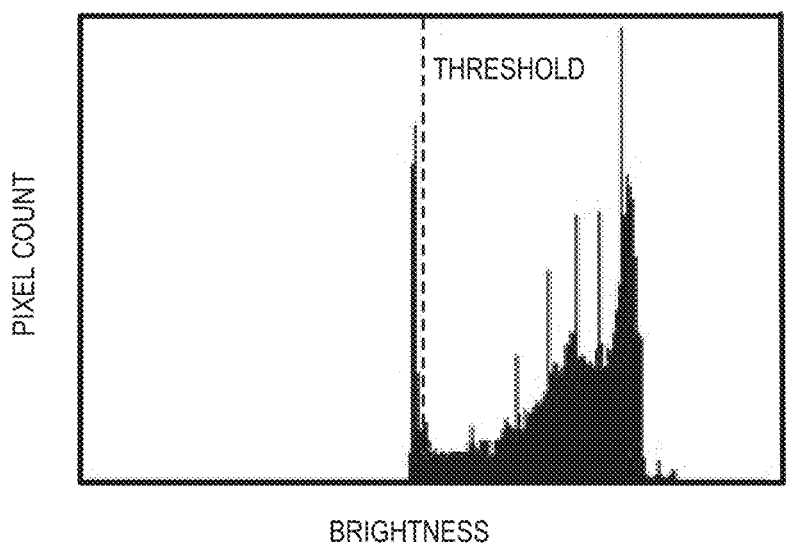
FIG. 11 illustrates processing for measuring a machined width.
Figure 12:
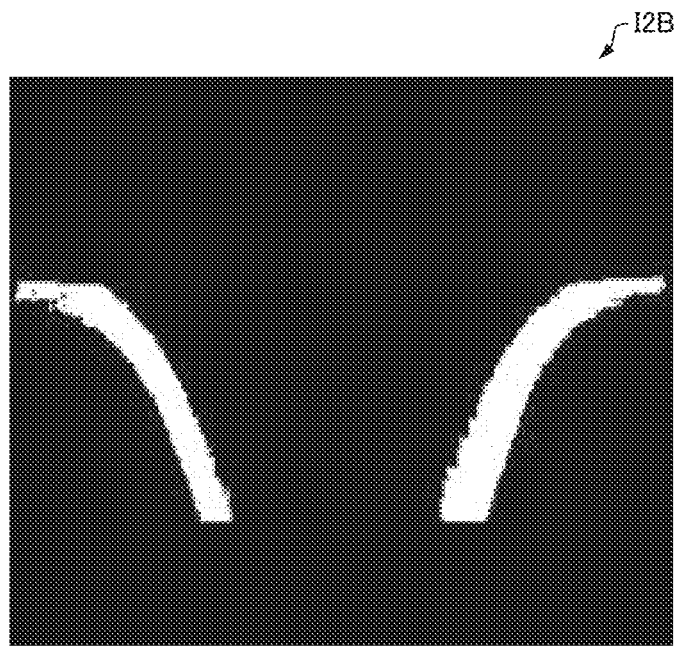
FIG. 12 illustrates processing for measuring a machined width.
Figure 13:
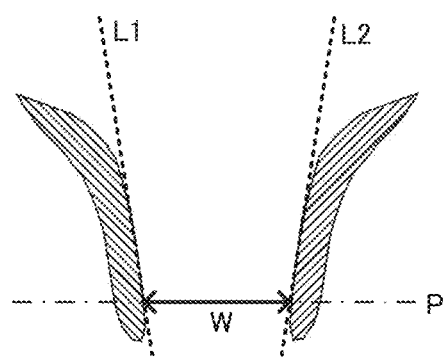
FIG. 13 illustrates processing for measuring a machined width.

FIGS. 11 to 13 illustrate processing for measuring the machined width W.

In the processing for measuring the machined width W, first, the information processing device 70 binarizes the image I2 (S110).

As illustrated in FIG. 11, the information processing device 70 binarizes the image I2 by setting a threshold so that the lowest brightness peak is selected from a brightness histogram of the image I2. Thus, a binarized image I2B illustrated in FIG. 12 can be generated. Note that image processing for removing noise from the image I2 may be performed before binarizing the image I2.

Here, the specimen 2 is subjected to coaxial illumination and transmission illumination, and therefore, on the image I2, only the inclined surfaces 3 are dark. Hence, the inclined surfaces 3 can be extracted by selecting the lowest brightness peak from the brightness histogram of the image I2 so as to binarize the image I2. In the example illustrated in FIG. 12, the image I2 is binarized by depicting pixels of a lower brightness than the threshold in white and depicting pixels of a brightness that equals or exceeds the threshold in black.

Next, the information processing device 70 specifies aggregates of white pixels corresponding to the inclined surfaces 3 on the binarized image I2B and determines whether or not the number of aggregates is two (S112).

In the initial stage of the machining, the machined region 5 has not yet reached the second end portion 2b of the specimen 2, and therefore the number of aggregates is one. Once the machined region 5 has reached the second end portion 2b of the specimen 2, the number of aggregates is two.

Further, in the initial stage of the machining, the inclined surfaces 3 are small, and it may therefore be impossible to select the peaks corresponding to the inclined surfaces 3 on the brightness histogram. In this case, the number of aggregates is three or more. Hence, by determining whether or not the number of aggregates is two, it is possible to determine whether or not the inclined surfaces 3 have been successfully extracted.

Note that here, whether or not the inclined surfaces 3 have been successfully extracted is determined by determining whether or not the number of aggregates is two, but the determination may be made using another condition. For example, when the number of pixels constituting the aggregate is smaller than a predetermined number, when the machining time has not yet reached a set time, when variation in the regions of the aggregates is large, and so on, it may be determined that the inclined surfaces 3 have not been successfully extracted.

After determining that the number of aggregates is not two (No in S112), the information processing device 70 returns to the processing S106 for acquiring the image I2.

Having determined that the number of aggregates is two (Yes in S112), as illustrated in FIG. 13, the information processing device 70 approximates respective edges of the two aggregates by straight lines so as to draw an approximate line L1 and an approximate line L2 (S114).

The information processing device 70 specifies a position P in which to measure the machined width W on the binarized image I2B from the information indicating the position in which to measure the machined width W acquired in the processing S100, and measures the machined width W by measuring the distance between the approximate line L1 and the approximate line L2 in the position P (S116).

The position P in which to measure the machined width W is specified by a position coordinate in a vertical direction of the binarized image I2B, for example.

Next, the information processing device 70 determines whether or not the measured machined width W equals or exceeds the target machined width TW (S118). In other words, the information processing device 70 determines whether or not W≥TW is satisfied.

Having determined that W≥TW is not satisfied (No in S118), the information processing device 70 returns to the processing S106 for acquiring the image I2.

The information processing device 70 repeats the processing S106 for acquiring the image, the processing S108 for determining whether or not the gap is expanding, the binarization processing S110, the processing S112 for determining whether or not the number of aggregates is two, the processing S114 for calculating approximate straight lines corresponding to the edges of the aggregates, the processing S116 for measuring the machined width W, and the processing S118 for determining whether or not W≥TW is satisfied either until W≥TW is determined to be satisfied or until the gap is determined to be expanding.

Having determined that the gap is expanding (Yes in S108) or having determined that W≥TW is satisfied (Yes in S118), the information processing device 70 causes the ion source 10 to stop emitting the ion beam IB (S120).

By performing the processing described above, the information processing device 70 completes the primary milling processing.

3.2.2. Processing for Determining Whether or not Gap is Expanding

Typically, when the machining progresses normally, the milled specimen 2 and so on adhere to the gap between the specimen 2 and the shielding member 30, and therefore the gap becomes smaller. However, when the gap becomes larger as the machining progresses, the upper end of the machined region 5 of the specimen 2 may be milled at an offset from directly below the shielding member 30. In other words, the possibility of the machining not progressing normally is high.

Hence, the information processing device 70 measures the size of the gap based on the brightness of each pixel of the image I2, for example. For example, the size of the gap is measured from a brightness profile in the vertical direction of the image I2. Here, the size of the gap denotes the size of the gap in the vertical direction of the image I2. In other words, the size of the gap is the distance between the specimen 2 and the shielding member 30.

Figure 14:
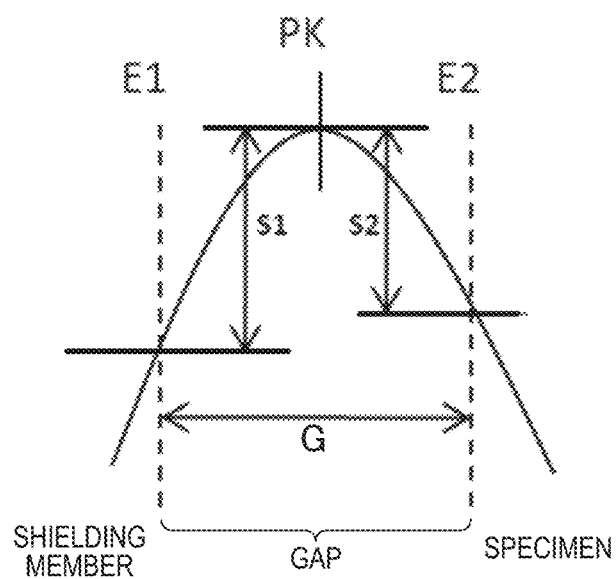
FIG. 14 illustrates processing for measuring the size of a gap.

FIG. 14 illustrates processing for measuring the size of the gap. FIG. 14 illustrates the brightness profile of a region of the image I2 corresponding to the gap.

As illustrated in FIG. 14, the size of the gap can be measured based on a brightness profile in the vertical direction of the image I2. For example, a size G of the gap is determined using the fact that the brightness reaches a maximum in the gap. More specifically, the size G of the gap is determined by determining a position E1 in which the brightness decreases from the brightness of a peak PK by a strength S1 and a position E2 in which the brightness decreases from the brightness of the peak PK by a strength S2 and calculating |E2−E1|. The strength S1 and the strength S2 may be set at any desired values.

The determination as to whether or not the gap is expanding is performed as follows. First, a first image photographed by the camera 60 and used as a reference and a second image acquired after the first image are acquired. Next, a size G1 of the gap on the first image is measured and a size G2 of the gap on the second image is measured. Next, the size G1 of the gap on the second image is compared with the size G2 of the gap on the first image, and when the size G2 of the gap on the second image is larger than the size G1 of the gap on the first image (G2>G1), it is determined that the gap is expanding.

Note that it may also be determined that the gap is expanding when a value (G2−G1) acquired by subtracting the size G1 of the gap on the first image from the size G2 of the gap on the second image equals or exceeds a predetermined value. Alternatively, for example, measurement results of the size G of the gap may be plotted, a function indicating a relationship between the size G of the gap and the elapsed time of the machining may be determined, and the determination as to whether or not the gap is expanding may be made from the function.

Further, in the above description, a determination is made as to whether or not the size of the gap is increasing, but instead, a determination may be made as to whether or not the size G of the gap is within a predetermined range. The size G of the gap between the specimen 2 and the shielding member 30 has a range that is suitable for preparing a specimen. For example, the size G of the gap is preferably approximately from 40 to 80 μm inclusive. When the size G of the gap deviates from this range, the machining is unlikely to progress normally. Hence, the information processing device 70 may determine whether or not the size G of the gap deviates from a predetermined range, and when the size G of the gap deviates from this range, the information processing device 70 may issue a notification thereof and perform processing for terminating the machining.

3.2.3. Processing for Predicting Machining Completion Time

The information processing device 70 performs processing for predicting the completion time of the machining in parallel with the primary milling processing described above.

For example, the information processing device 70 acquires information indicating the machined width W measured in the processing S116 for measuring the machined width W, and calculates an increase speed at which the machined width W is increasing. The completion time of the machining is calculated from this increase speed.

The information processing device 70 may represent the approach of the machined width W toward the target machined width TW on a progress bar or the like and display the progress bar or the like on the display unit 80. Thus, the user can ascertain the progress status of the machining.

Alternatively, the information processing device 70 may create a graph of change in the machined width W, showing time on the horizontal axis and the machined width W on the vertical axis, and display the graph on the display unit 80. At this time, the information processing device 70 may display the current graph of change in the machined width W side by side with a graph of change in the machined width W created in the past. In so doing, it is possible to determine whether or not the machining is progressing normally. For example, by comparing the current graph with the past graph, it is possible to notice abnormalities in the machining speed.

Note that from the start of the machining to the point at which two inclined surfaces 3 are formed, information indicating the machined width W measured in the processing S116 for measuring the machined width W cannot be acquired. Hence, when the number of aggregates on the binarized image I2B is one, the information processing device 70 may predict the completion time of the machining from change in the position of an outside edge of the aggregate or change in the position of an inside edge of the aggregate.

Figure 15:
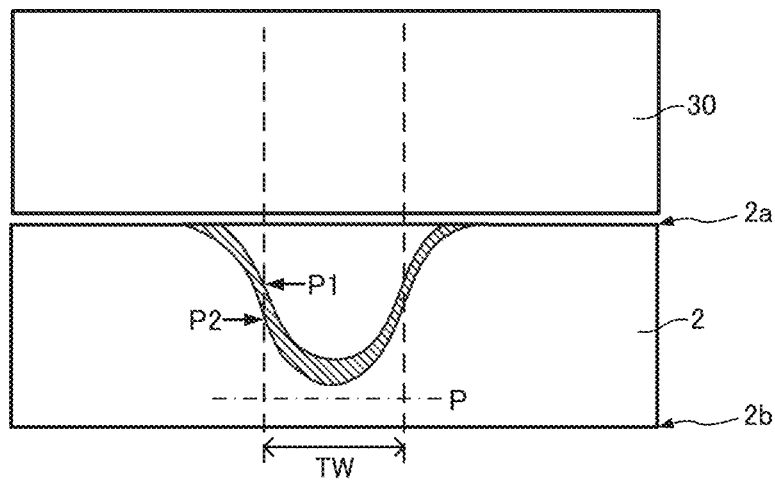
FIG. 15 illustrates a method for predicting a machining completion time.

FIG. 15 illustrates a method for predicting the completion time of the machining.

When the number of aggregates on the binarized image I2B is one, the coordinates of a position P2 of the outside edge of the aggregate are plotted, and the machining completion time is predicted based on change in the position P2. Then, when the machining progresses such that the inside edge of the aggregate becomes clear, the coordinates of a position P1 of the inside edge of the aggregate are plotted and the machining completion time is predicted based on change in the position P1. For example, the position P1 is a position where the inside edge of the aggregate intersects one of two straight lines that extend in the vertical direction and are drawn at an interval corresponding to the target machined width TW. The position P2 is a position where the outside edge of the aggregate intersects one of the two straight lines that extend in the vertical direction and are drawn at an interval corresponding to the target machined width TW.

Figure 16:
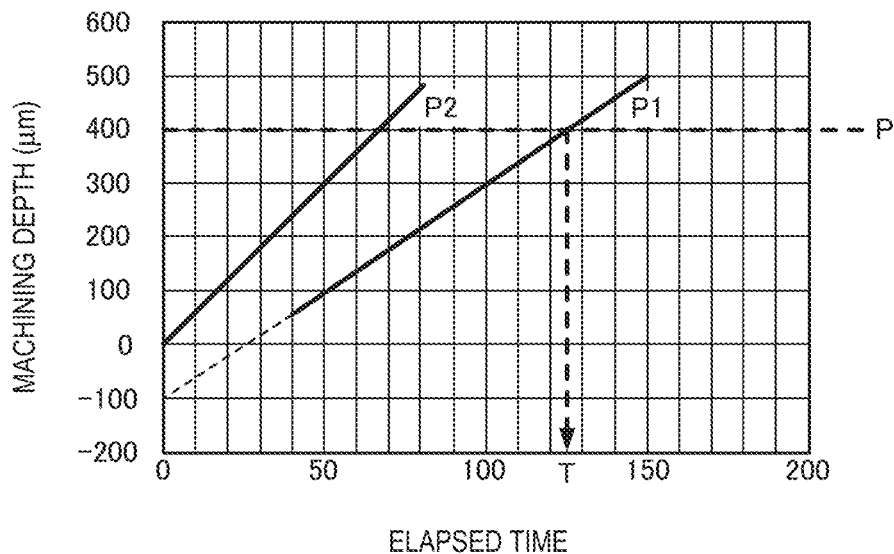
FIG. 16 is a graph plotting coordinates of a position P1 and coordinates of a position P2.

FIG. 16 is a graph plotting coordinates of the position P1 and coordinates of the position P2. The horizontal axis of the graph illustrated in FIG. 16 shows the elapsed time from the start of the machining (emission of the ion beam IB), and the vertical axis shows the machining depth. Note that the machining depth of the position P1 corresponds to the distance between the position P1 and the first end portion 2a of the specimen 2, while the machining depth of the position P2 corresponds to the distance between the position P2 and the first end portion 2a.

When the completion time is predicted based on change in the position P1, the completion time of the machining is predicted by, for example, calculating the speed at which the distance between the position P1 and the position P in which to measure the machined width W decreases and calculating the time required for the position P1 to reach the position P based on the calculated speed.

Further, for example, when the completion time is predicted based on change in the position P2, the speed at which the distance between the position P2 and the position P decreases is calculated. The speed at which the distance between the position P1 and the position P decreases is then estimated from the calculated speed, whereupon the completion time of the machining is calculated therefrom.

In the example illustrated in FIG. 16, the machined region 5 is not formed inside the inclined surface 3 for 40 minutes following the start of the machining, and therefore a machining completion time T is predicted based on change in the position P2. Thus, the machining completion time T can be predicted even at the initial stage of the machining.

From 40 minutes after the start of the machining onward, the machining completion time T is predicted based on the position P1. Thus, the machining completion time T can be predicted based on the position P1.

Note that when the thickness of the specimen 2 prior to the start of the machining is always the same, the distance between the inside edge position P1 and the outside edge position P2 is substantially fixed. Hence, at all times during the machining, the machining completion time T may be predicted by estimating the inside edge position P1 from the outside edge position P2.

The outside edge of the aggregate is usually clearer than the inside edge of the aggregate. The reason for this is that the boundary between the inclined surface 3 and the machined region 5 inclines gently in accordance with a strength distribution of the ion beam IB. Hence, on the binarized image, the outside edge of the aggregate is clearer than the inside edge of the aggregate.

In other words, the position P2 can be specified more accurately than the position P1. Therefore, at all times during the machining, the machining completion time T can be predicted accurately by predicting the machining completion time T based on the position P2.

3.3. Preparation for Secondary Milling
3.3.1. Setting of Specimen

After the primary milling is complete and before starting the secondary milling, the specimen 2 is turned upside down, as illustrated in FIG. 6, so that the second end portion 2b of the specimen 2 faces upward and the first end portion 2a faces downward. For example, the chamber is opened to the atmosphere, whereupon the user turns the specimen 2 disposed on the specimen stage 20 upside down. After turning the specimen 2 upside down and fixing the specimen 2 to the specimen stage 20, the shielding member 30 is removed. The interior of the chamber is then evacuated.

Note that the specimen stage 20 may include an inverting mechanism for turning the specimen 2 upside down. Thus, the specimen 2 can be turned upside down without opening the chamber to the atmosphere.

3.3.2. Specification of Target Position

Figure 17:
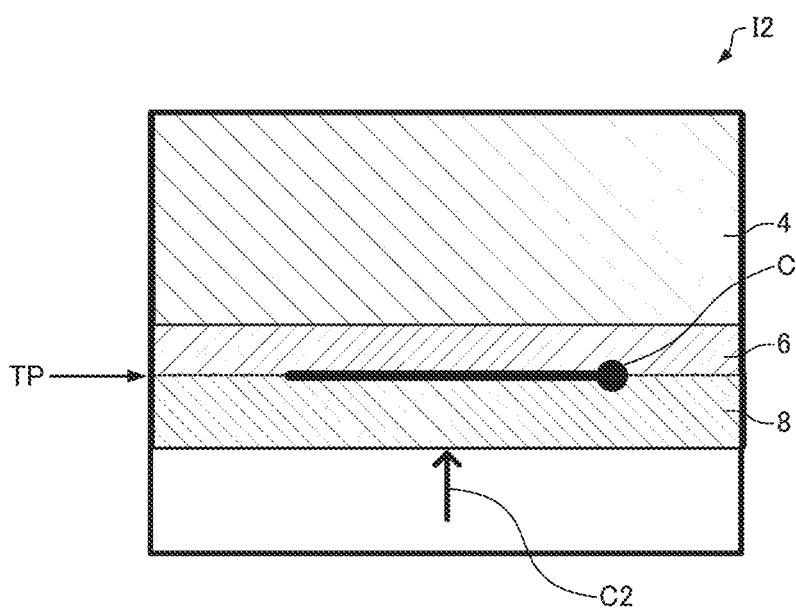
FIG. 17 illustrates processing for specifying a target position.

FIG. 17 illustrates processing for specifying a target position TP.

The user specifies the target position TP of the machining. In the secondary milling, the machining is terminated when the edge of the machined region 5 or a hole formed in the machined region 5 reaches the specified target position TP.

The information processing device 70 displays a GUI screen on the display unit 80. The image I2 and a cursor C for inputting the target position TP of the machining are displayed in a window of the GUI screen. Further, an arrow C2 indicating the direction in which the machining progresses is displayed in the window together with the cursor C. The user can specify the target position TP by moving the cursor C via the operation unit. When the user specifies the target position TP using the cursor C, information indicating the target position TP is input into the information processing device 70. Note that the method for setting the target position TP is not limited to this method.

For example, the image I2 used to specify the target position TP is an image acquired by photographing the specimen 2 while the specimen 2 is illuminated by transmission illumination and coaxial illumination. Note that during the machining performed by secondary milling, the specimen 2 is illuminated by transmission illumination.

3.4. Secondary Milling
3.4.1. Flow of Secondary Milling

Figure 18:
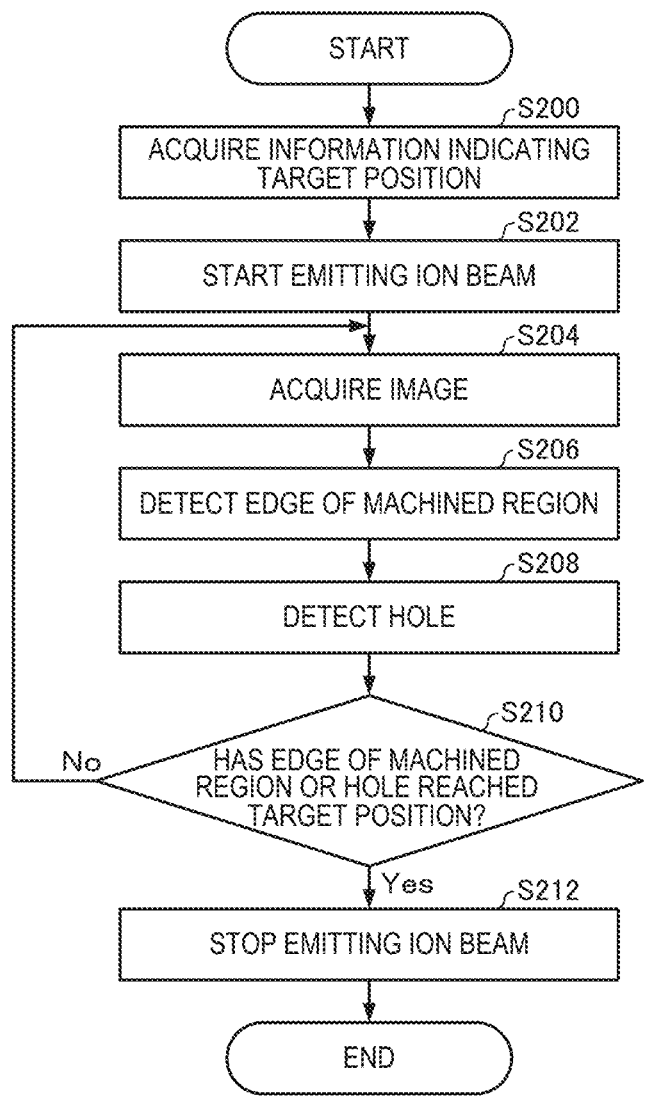
FIG. 18 is a flowchart illustrating an example of secondary milling processing performed by an information processing device.

In the specimen machining device 100, the information processing device 70 performs secondary milling processing for machining the specimen 2 by means of secondary milling. FIG. 18 is a flowchart illustrating an example of the secondary milling processing performed by the information processing device 70.

When the user inputs an instruction to start secondary milling into the information processing device 70, the information processing device 70 acquires information indicating the target position TP (S200). The user can specify the target position TP by moving the position of the cursor C via the operation unit. The information processing device 70 acquires the information indicating the target position TP, specified using the cursor C, via the operation unit.

Next, the information processing device 70 performs processing for starting to emit the ion beam IB (S202). As a result, the ion beam IB is emitted onto the specimen 2 from the ion source 10. At this time, the swing mechanism of the specimen stage 20 swings the specimen 2.

In the specimen machining device 100, as described above, the specimen 2 is machined by irradiating the specimen 2 with the ion beam IB while swinging the specimen 2. While the specimen 2 is being machined, the camera 60 photographs the specimen 2.

When the machining is started, the information processing device 70 acquires the image I2 of the specimen 2 photographed by the camera 60 (S204).

Figure 19:
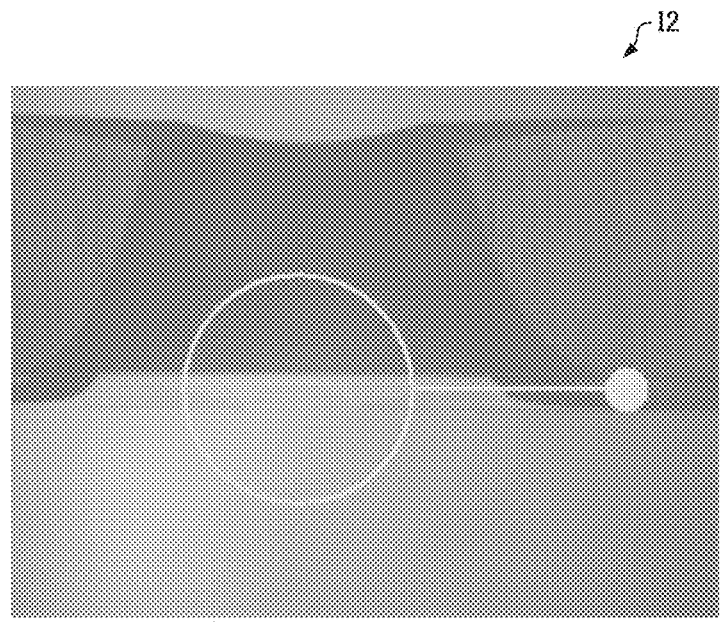
FIG. 19 schematically illustrates an image photographed by a camera.

FIG. 19 schematically illustrates the image I2 photographed by the camera 60.

The image I2 photographed during the machining is an image acquired by photographing the specimen 2 while the specimen 2 is illuminated by transmission illumination. As illustrated in FIG. 19, the information processing device 70 acquires the image I2 photographed by the camera 60 at a timing when the specimen 2 is horizontal. In so doing, the tilt of the specimen 2 does not have to be taken into account during the image processing to be described below. Further, the information processing device 70 acquires the image I2 once during a single period of the swinging operation of the specimen 2. In so doing, the difference between the images due to operation backlash can be reduced.

Note that the circular cursor illustrated in FIG. 19 is used to specify a processing range during processing for detecting the edge of the machined region 5 and processing for detecting a hole, to be described below. The user can modify the processing range by moving the position of the cursor via the operation unit. Note that instead of specifying a processing range using the cursor, processing may be performed on the entire image I2.

Next, the information processing device 70 detects the edge of the machined region 5 on the image I2 (S206).

Figure 20:
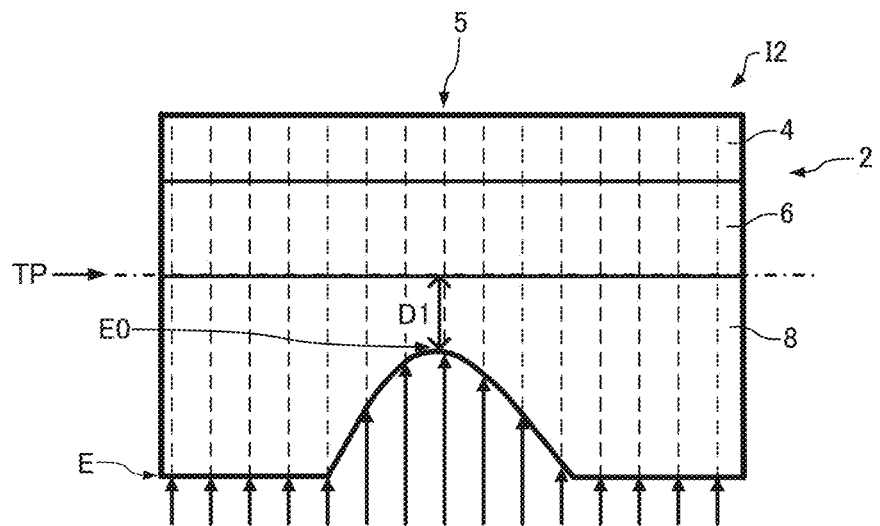
FIG. 20 illustrates processing for detecting an edge of a lower end of a machined region.

FIG. 20 illustrates processing for detecting a lower end edge E of the machined region 5. Lines on which brightness profiles are acquired in order to detect the lower end edge E of the machined region 5 are illustrated in FIG. 20 by broken lines.

As illustrated in FIG. 20, the information processing device 70 acquires a plurality of brightness profiles in the vertical direction of the image I2 and specifies the position of the lower end edge E of the machined region 5. On the vertical direction brightness profiles of the image I2, the brightness varies greatly at the lower end edge E of the machined region 5, and therefore the edge E is detected from this brightness variation. The information processing device 70 specifies an edge E0 having the shortest distance to the target position TP from the detection results of the edge E on the plurality of brightness profiles. The information processing device 70 then calculates a distance D1 between the edge E0 and the target position TP.

Figure 21:
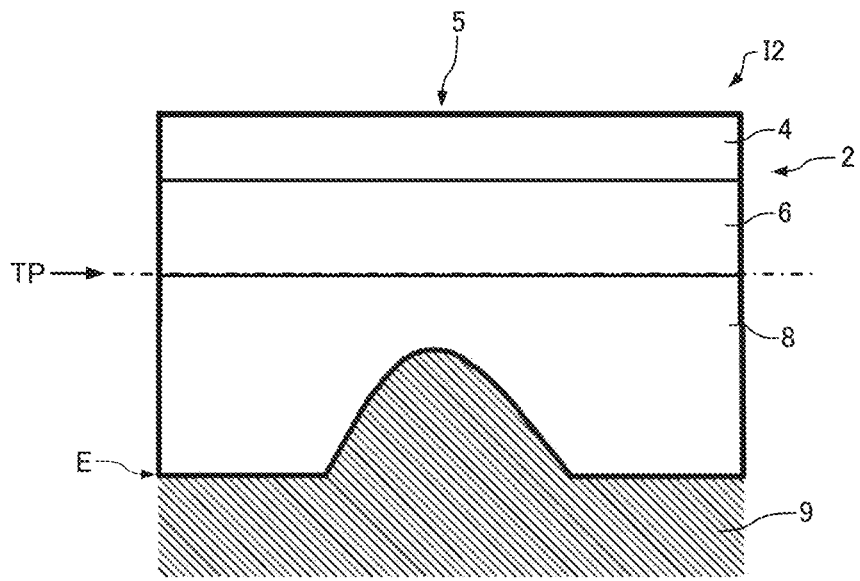
FIG. 21 illustrates processing for drawing an edge of a machined region in a predetermined color.

FIG. 21 illustrates processing for drawing the edge E in a predetermined color.

As illustrated in FIG. 21, the information processing device 70 draws a region 9 that is adjacent to the edge E on the image I2 in a predetermined color in order to emphasize the detected edge E. In so doing, the edge E can be emphasized. In the example in the figure, the region 9 of the image I2 is a region corresponding to the space below the specimen 2.

Note that the method for emphasizing the edge E is not limited to this method. For example, the edge E may be drawn in a predetermined color.

Next, the information processing device 70 detects a hole formed in the machined region 5 on the image I2 (S208).

Figure 22:
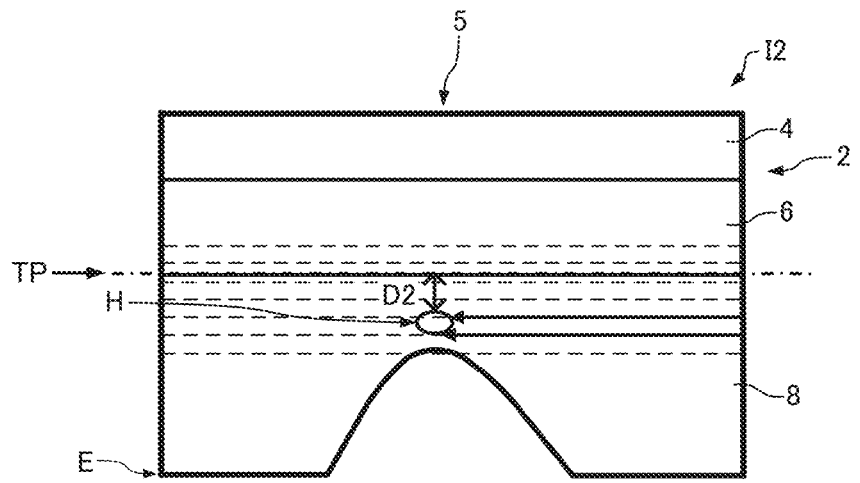
FIG. 22 illustrates processing for detecting a hole formed in a machined region.
Figure 23:
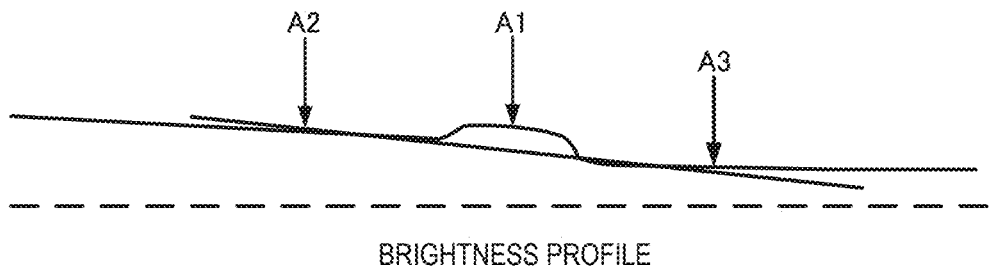
FIG. 23 illustrates processing for detecting a hole formed in a machined region.

FIGS. 22 and 23 illustrate processing for detecting a hole H formed in the machined region 5. Lines on which brightness profiles are acquired in order to detect the hole H are illustrated in FIG. 22 by broken lines. FIG. 23 illustrates an example of a brightness profile.

As illustrated in FIG. 22, as the machining progresses, the hole H may be formed between the edge E of the machined region 5 and the target position TP.

The information processing device 70 acquires a plurality of brightness profiles in the vertical direction of the image I2 and detects the hole H formed in the machined region 5 therefrom.

For example, when determining whether or not an arbitrary first region A1 of the image I2 is the hole H, the determination as to whether or not the first region A1 is the hole H is made based on the brightness of the first region A1 and the brightness of a second region A2 and a third region A3 sandwiching the first region A1. The first region A1, the second region A2, and the third region A3 may each be a single pixel or a set of a plurality of pixels. Furthermore, the distance between the first region A1 and the second region A2 and the distance between the first region A1 and the third region A3 may each be set as appropriate.

In the example illustrated in FIG. 23, a difference between a brightness Lu1 of the first region A1 and an average value of a brightness Lu2 of the second region A2 and a brightness Lu3 of the third region A3 is set as a signal strength of the first region A1. In other words, the signal strength of the first region A1 is expressed by signal strength=Lu1−(Lu2+Lu3)/2. Processing for modifying the position of the first region A1 and then determining the signal strength is performed on all regions of the image I2. As a result, the signal strengths of all of the regions of the image I2 are acquired.

Next, information indicating a maximum value of the signal strength is acquired from the signal strengths of all of the regions of the image I2. The maximum value is the signal strength of a region in which the illumination light emitted by transmission illumination is directly detected, for example. Next, the information processing device 70 determines a region in which the signal strength equals or exceeds a predetermined value as the hole H. The predetermined value is set at a value of 90% of the acquired maximum value of the signal strength, for example.

Here, a region in which the signal strength increases locally due to noise or the like may be determined as the hole H. Therefore, when the surface area of the region in which the signal strength equals or exceeds the predetermined value increases beyond a set value, the region may be determined as the hole H. The set value may be set as desired. Alternatively, noise removal and removal of gentle brightness unevenness may be performed prior to acquiring the aforesaid brightness profiles by applying a filter to the image I2.

Having detected the hole H, the information processing device 70 calculates a distance (the shortest distance) D2 between the hole H and the target position TP.

Figure 24:
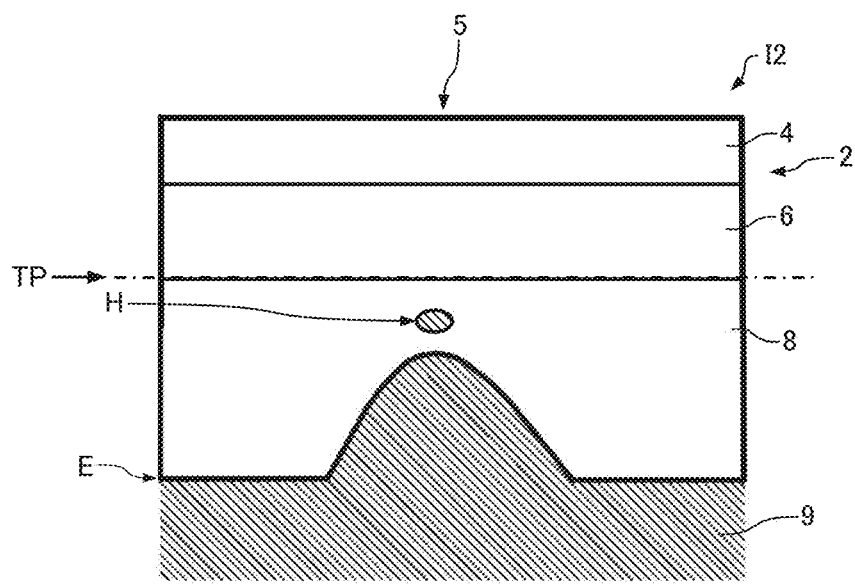
FIG. 24 illustrates processing for drawing a hole in a predetermined color.

Further, the information processing device 70 draws the detected hole H in a predetermined color. FIG. 24 illustrates processing for drawing the hole H in a predetermined color.

As illustrated in FIG. 24, the information processing device 70 draws the detected hole H in a predetermined color on the image I2. As a result, the hole H can be emphasized.

Next, the information processing device 70 determines whether or not the edge E of the machined region 5 or the hole H has reached the target position TP (S210).

First, the information processing device 70 compares the distance between the edge E0 and the target position TP with the distance between the hole H and the target position TP. When the distance between the edge E0 and the target position TP is shorter than the distance between the hole H and the target position TP, the information processing device 70 determines whether or not the edge E0 has reached the target position TP based on the coordinates of the edge E0 and the coordinates of the target position TP on the image I2. For example, whether or not the edge E0 has reached the target position TP can be determined from the coordinate of the edge E0 and the coordinate of the target position TP in the vertical direction of the image I2.

When the distance between the hole H and the target position TP is shorter than the distance between the edge E0 and the target position TP, the information processing device 70 determines whether or not the hole H has reached the target position TP based on the coordinates of the hole H and the coordinates of the target position TP on the image I2.

Having determined that the edge E of the machined region 5 or the hole H has not reached the target position TP (No in S210), the information processing device 70 returns to the processing S204 for acquiring the image I2.

The information processing device 70 repeats the processing S204 for acquiring the image, the processing S206 for detecting the edge E of the machined region 5, the processing S208 for detecting the hole H, and the processing S210 for determining whether or not the edge E of the machined region 5 or the hole H has reached the target position TP until it is determined that the edge E of the machined region 5 or the hole H has reached the target position TP.

Having determined that the edge E of the machined region 5 or the hole H has reached the target position TP (Yes in S210), the information processing device 70 causes the ion source 10 to stop emitting the ion beam IB (S212).

By performing the processing described above, the information processing device 70 completes the secondary milling processing.

3.4.2. Processing for Predicting Machining Completion Time

The information processing device 70 performs processing for predicting the completion time of the machining in parallel with the secondary milling processing described above.

For example, the information processing device 70 sets the smaller of the distance between the edge E of the machined region 5 and the target position TP and the distance between the hole H and the target position TP as a remaining film thickness, and predicts the completion time of the machining based on change in the remaining film thickness.

Figure 25:
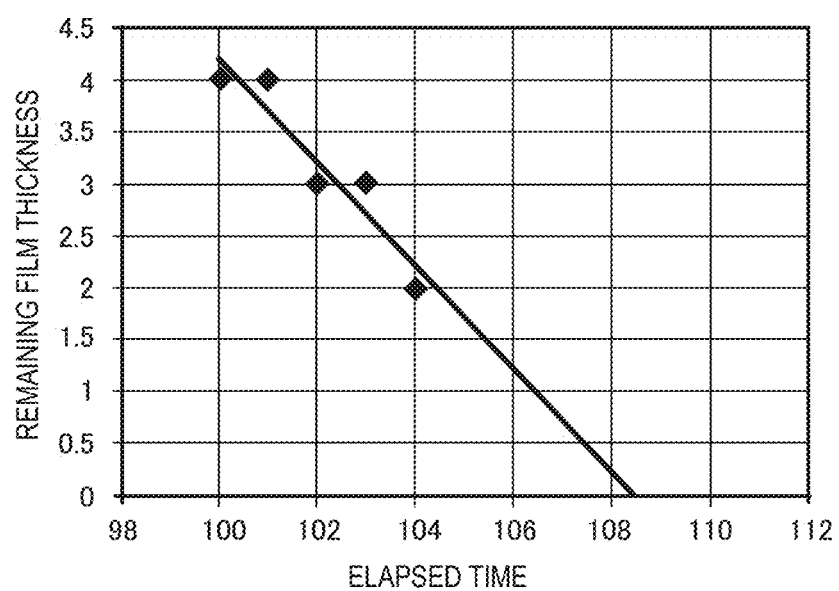
FIG. 25 is a graph illustrating a relationship between a remaining film thickness and an elapsed time from start of machining.

FIG. 25 is a graph illustrating a relationship between the remaining film thickness and the elapsed time from the start of the machining.

As illustrated in FIG. 25, by calculating the remaining film thickness and plotting the calculated remaining film thickness on a graph showing the elapsed time on the horizontal axis and the remaining film thickness on the vertical axis, a function indicating the relationship between the remaining film thickness and the elapsed time can be calculated. In the example illustrated in FIG. 25, a function indicating the relationship between the remaining film thickness and the elapsed time has been calculated by a straight line approximation calculation. Using this function, the time at which the remaining film thickness will reach zero can be calculated. The information processing device 70 displays the time at which the remaining film thickness will reach zero, or in other words the predicted completion time of the machining, on a GUI screen.

The information processing device 70 may represent the approach of the remaining film thickness toward zero on a progress bar or the like and display the progress bar or the like on the display unit 80. Thus, the user can ascertain the progress status of the machining.

3.4.3. Automatic Setting of Target Position

In the secondary milling processing illustrated in FIG. 18, the user sets the target position TP by specifying the target position TP using the cursor C, as illustrated in FIG. 17. Instead, however, the information processing device 70 may set the target position TP automatically. For example, the information processing device 70 sets the target position TP automatically on a boundary between the laminated film 6 and the protective member 8.

Figure 26:
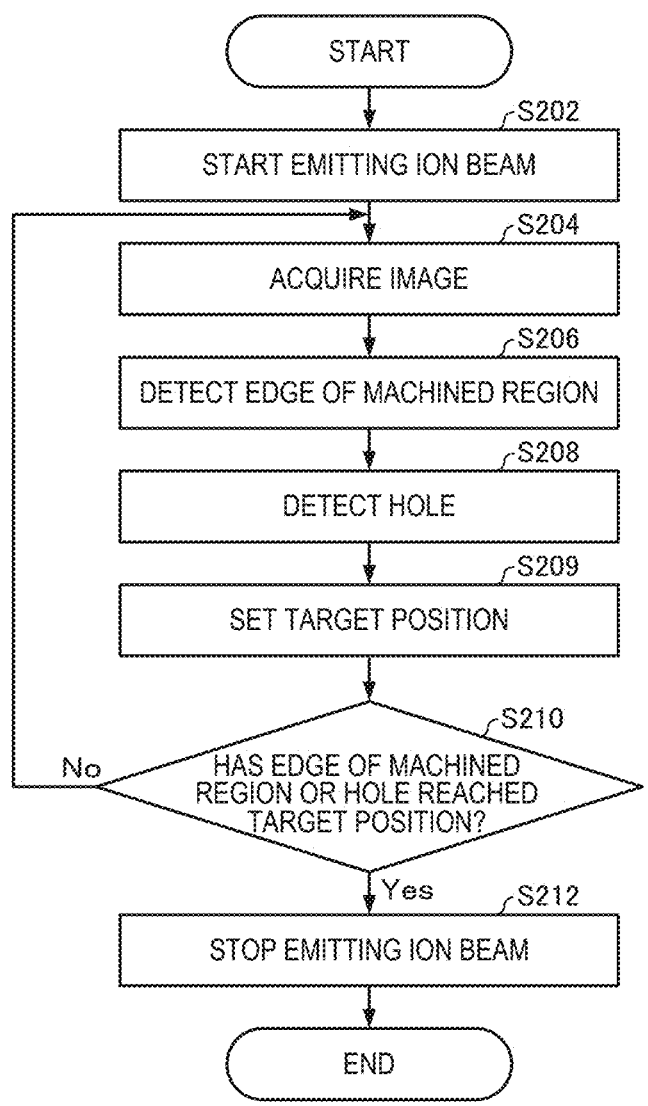
FIG. 26 is a flowchart illustrating a modified example of secondary milling processing performed by an information processing device.

FIG. 26 is a flowchart illustrating a modified example of the secondary milling processing performed by the information processing device 70.

The modified example of the secondary milling processing illustrated in FIG. 26 differs from the secondary milling processing illustrated in FIG. 18 in that after the processing S208 for detecting a hole, processing S209 is performed to set the target position TP. All other processing is similar to the processing illustrated in FIG. 18, and therefore description thereof has been omitted.

In the processing S209 for setting the target position TP, similarly to the processing S206 for detecting the edge E of the machined region 5, illustrated in FIG. 20, a plurality of brightness profiles are acquired in the vertical direction of the image I2, and the boundary between the laminated film 6 and the protective member 8 is detected from brightness variation on the boundary. The information processing device 70 sets the detected boundary as the target position TP. When the information processing device 70 sets the boundary in this manner, a marker indicating the target position TP is displayed on the image I2 in a position corresponding to the boundary.

Thus, the information processing device 70 can set the target position TP automatically.

4. EFFECTS 4.1. Effects of Primary Milling

In the specimen machining device 100, the information processing device 70 performs processing for acquiring information indicating the target machined width TW, processing for acquiring the image I2, which is acquired by photographing the specimen 2 while the specimen 2 is illuminated by coaxial illumination, processing for measuring the machined width W on the acquired image I2, and processing for terminating the machining when the measured machined width W equals or exceeds the target machined width TW.

By illuminating the specimen 2 by means of coaxial illumination, as described above, on the image I2, as illustrated in FIG. 5, the machined region 5 of the specimen 2, the unmachined region of the specimen 2, and the shielding member 30 are light while the inclined surfaces 3 are dark. Accordingly, the inclined surfaces 3 can easily be extracted from the image I2, and the machined region 5 sandwiched between the two inclined surfaces 3 can easily be specified. Hence, with the specimen machining device 100, the machined width W can be measured accurately, and the timing at which to terminate the machining can be determined accurately based on the machined width W. As a result, during the primary milling, the specimen 2 can be machined with high reproducibility and a high degree of precision, enabling an improvement in the success rate of specimen preparation during the secondary milling.

In the specimen machining device 100, during the processing for measuring the machined width W, the information processing device 70 generates the binarized image I2B by binarizing the image I2, and measures the machined width W on the binarized image I2B. On the image I2 acquired by photographing the specimen 2 while the specimen 2 is illuminated by coaxial illumination, the machined region 5 is light and the inclined surfaces 3 are dark, and therefore the inclined surfaces 3 can be extracted by performing the binarization processing. As a result, the machined region 5 sandwiched between the two inclined surfaces 3 can easily be specified, and the machined width W can be measured accurately.

In the specimen machining device 100, during the processing for measuring the machined width W, the information processing device 70 extracts the inclined surfaces 3 formed by the machining, by binarizing the image I2, determines whether or not the number of extracted inclined surfaces 3 is two, and when the number of inclined surfaces 3 is two, measures the machined width W by measuring the distance between the two inclined surfaces 3. Hence, with the specimen machining device 100, the machined region 5 sandwiched between the two inclined surfaces 3 can easily be specified, and the machined width W can be measured accurately.

In the specimen machining device 100, the information processing device 70 includes the transmission illumination device 40 for emitting illumination light that is transmitted through and illuminates the specimen 2, and the camera 60 photographs the specimen 2 while the specimen 2 is illuminated by coaxial illumination and transmission illumination. When the specimen 2 is illuminated by transmission illumination, on the image I2, the gap between the specimen 2 and the shielding member 30 and the space below the specimen 2 become light. Accordingly, only the inclined surfaces 3 on the image I2 are dark, and as a result, the machined region 5 sandwiched between the two inclined surfaces 3 can easily be specified.

In the specimen machining device 100, the information processing device 70 performs processing for predicting the completion time of the machining based on the measurement result of the machined width W. Hence, with the specimen machining device 100, the burden on the user can be lightened.

In the specimen machining device 100, during the processing for acquiring the image I2, the information processing device 70 acquires the image I2 photographed by the camera 60 at a timing when the specimen 2 is horizontal. With the specimen machining device 100, therefore, the tilt of the specimen 2 need not be taken into account during the image processing performed on the image I2.

In the specimen machining device 100, during the processing for acquiring the image I2 photographed by the camera 60, the information processing device 70 acquires a first image and a second image photographed after the first image and performs processing for measuring the size of the gap on the first image, and processing for measuring the size of the gap on the second image, processing for comparing the size of the gap on the second image with the size of the gap on the first image, and processing for terminating the machining when the size of the gap on the second image is larger than the size of the gap on the first image. Hence, with the specimen machining device 100, machining of the specimen 2 can be interrupted automatically when the machining is not progressing normally.

4.2. Effects of Secondary Milling

In the specimen machining device 100, the information processing device 70 performs processing for acquiring the image I2, processing for acquiring information indicating the target position TP of the machining, processing for detecting the edge E of the machined region 5 on the image I2, processing for detecting the hole H formed in the machined region 5 on the image I2, processing for determining whether or not the edge E of the machined region 5 or the hole H has reached the target position TP, and processing for terminating the machining when the edge E of the machined region 5 or the hole H is determined to have reached the target position TP.

Hence, in the specimen machining device 100, the edge E of the machined region 5 and the hole H are detected, and when it is determined that the edge E of the machined region 5 or the hole H has reached the target position TP, the machining is terminated. With the specimen machining device 100, therefore, the timing at which to terminate the machining can be determined accurately. Moreover, with the specimen machining device 100, the specimen 2 can be machined with high reproducibility.

In the specimen machining device 100, during the processing for detecting the hole H, the information processing device 70 determines whether or not the first region A1 of the image I2 is the hole H based on the brightness of the first region A1 and the brightness of the second region A2 and the third region A3 sandwiching the first region A1. More specifically, the information processing device 70 sets the difference between the brightness of the first region A1 and the average value of the brightness of the second region A2 and the brightness of the third region A3 as the signal strength of the first region A1, and determines that the first region A1 is the hole H when the signal strength equals or exceeds a predetermined value. Thus, the hole H can be specified.

In the specimen machining device 100, when the distance between the edge E of the machined region 5 and the target position TP is shorter than the distance between the hole H and the target position TP, the information processing device 70 performs the processing for predicting the completion time of the machining based on the distance between the edge E of the machined region 5 and the target position TP. Further, when the distance between the hole H and the target position TP is shorter than the distance between the edge E of the machined region 5 and the target position TP, the information processing device 70 performs the processing for predicting the completion time of the machining based on the distance between the hole H and the target position TP. Hence, with the specimen machining device 100, the completion time of the machining can be predicted accurately.

In the specimen machining device 100, the specimen 2 includes the laminated film 6 serving as the machining subject, and the protective member 8 adhered to the machining subject, and during the processing for acquiring the information indicating the target position TP, the information processing device 70 specifies the boundary between the laminated film 6 and the protective member 8 on the image I2, and sets the position of the boundary as the target position TP. Hence, with the specimen machining device 100, the target position TP can be set automatically.

5. MODIFIED EXAMPLES 5.1. First Modified Example

In the embodiment described above, during the secondary milling, the acceleration voltage may be modified in stages in accordance with the thickness of the specimen 2. For example, the acceleration voltage may be reduced as the specimen 2 becomes thinner. As a result, the effects of damage to the specimen 2 caused by being irradiated with the ion beam IB can be reduced.

For example, the remaining film thickness, which is the smaller of the distance between the edge E of the machined region 5 and the target position TP and the distance between the hole H and the target position TP, corresponds to the thickness of the specimen 2.

Hence, the acceleration voltage is modified in stages in accordance with the measured remaining film thickness. In other words, the acceleration voltage is reduced in stages as the remaining film thickness decreases. In so doing, it is possible to prepare a specimen that suffers little damage when irradiated with the ion beam IB.

5.2. Second Modified Example

In the primary milling processing illustrated in FIG. 9, the information processing device 70 may perform processing for correcting positional deviation on the image I2.

For example, when the specimen 2 is cooled in order to reduce the damage caused by being irradiated with the ion beam IB, positional deviation may occur on the photographed image I2 due to temperature change in the specimen 2 and temperature change in the specimen stage 20. Further, for example, positional deviation may occur on the photographed image I2 due to mechanical operation backlash in the swing mechanism of the specimen stage 20.

Therefore, the specimen machining device 100 corrects positional deviation on a subsequently photographed image I2 using the image I2 photographed first as a reference. For example, the position of the gap between the specimen 2 and the shielding member 30 and the edges of the specimen 2 are specified on each of the two images I2 using brightness profiles or the like, whereupon positional deviation therebetween is corrected. Note that positional deviation may also be corrected by perform pattern matching on the two images I2.

By correcting the positional deviation of the image I2, positional deviation in the position P in which to measure the machined width W can be corrected.

Furthermore, likewise in the secondary milling processing illustrated in FIG. 18, the information processing device 70 may perform similar processing for correcting positional deviation on the image I2. By correcting the positional deviation of the image I2, positional deviation in the target position TP can be corrected.

5.3. Third Modified Example

In the embodiment described above, whether or not to terminate the machining is determined based on the machined width W during the primary milling stage of a two-stage milling method, but the method for determining whether or not to terminate the machining can also be applied to another specimen machining method. For example, whether or not to terminate the machining may be determined based on the machined width W likewise in a case where a cross-section specimen is prepared using a cross-section polisher (registered trademark).

Figure 27:
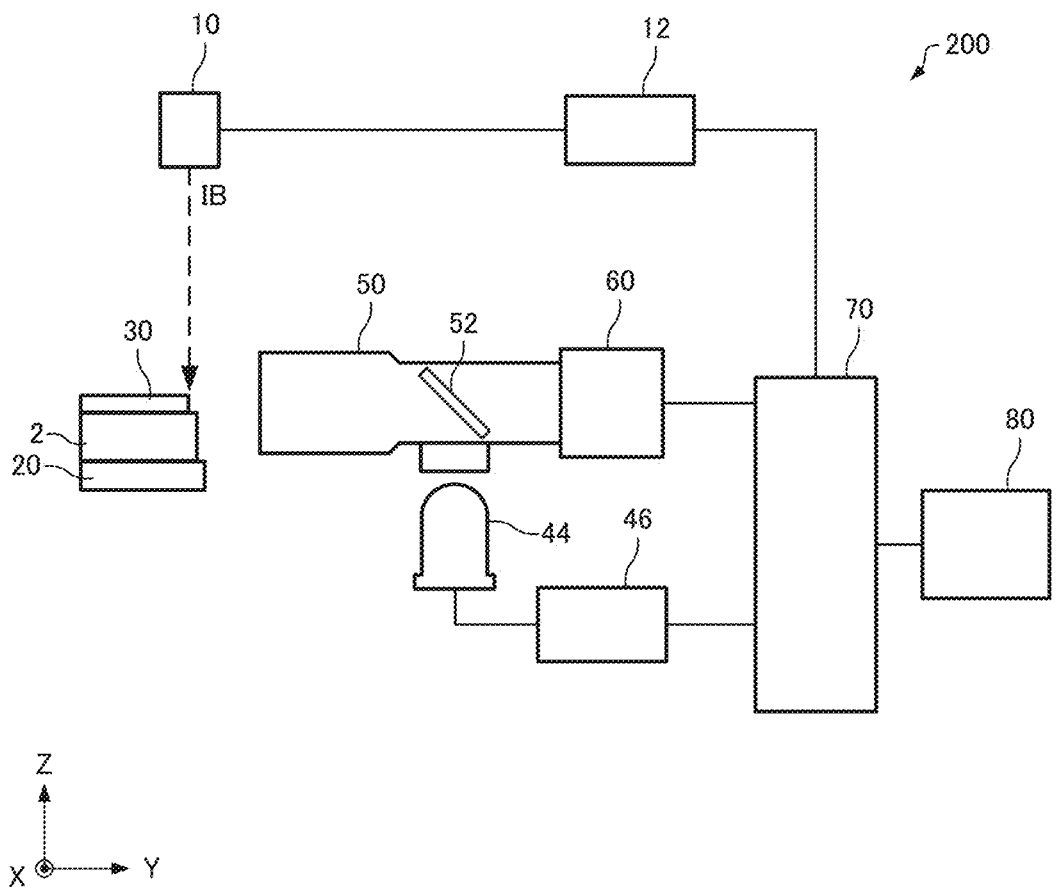
FIG. 27 is a diagram illustrating a configuration of a specimen machining device according to the third modified example.

FIG. 27 is a diagram illustrating the configuration of a specimen machining device 200 according to the third modified example. In the specimen machining device 200 illustrated in FIG. 27, members having similar functions to the constituent members of the specimen machining device 100 illustrated in FIG. 1 have been allocated identical reference numerals, and detailed description thereof has been omitted.

In the specimen machining device 200, the shielding member 30 is a plate-shaped shielding plate disposed directly on top of the specimen 2. When the ion beam IB is emitted from the ion source 10, a part of the specimen 2 that projects from the shielding member 30 is sputtered such that a cross-section of the specimen 2 is exposed in a position on an end surface of the shielding member 30. Thus, with the specimen machining device 200, a cross-section specimen can be prepared.

Figure 28:
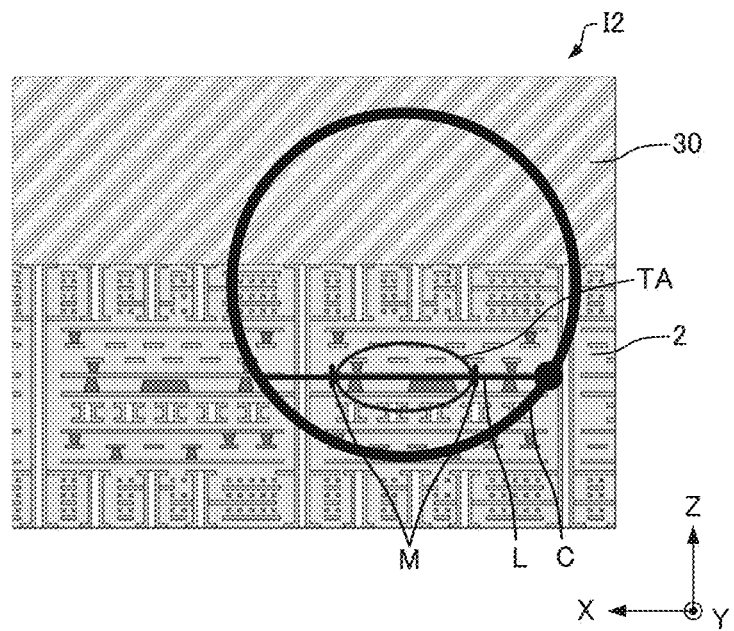
FIG. 28 schematically illustrates an image photographed by a camera of a specimen prior to machining.

FIG. 28 schematically illustrates the image I2 of the specimen 2 photographed by the camera 60 prior to machining.

When the observation subject is a machining region TA illustrated in FIG. 28, the position in which to measure the machined width W may be specified using the cursor C in a similar manner to the case of specifying the position in which to measure the machined width W illustrated in FIG. 8 and described above.

Figure 29:
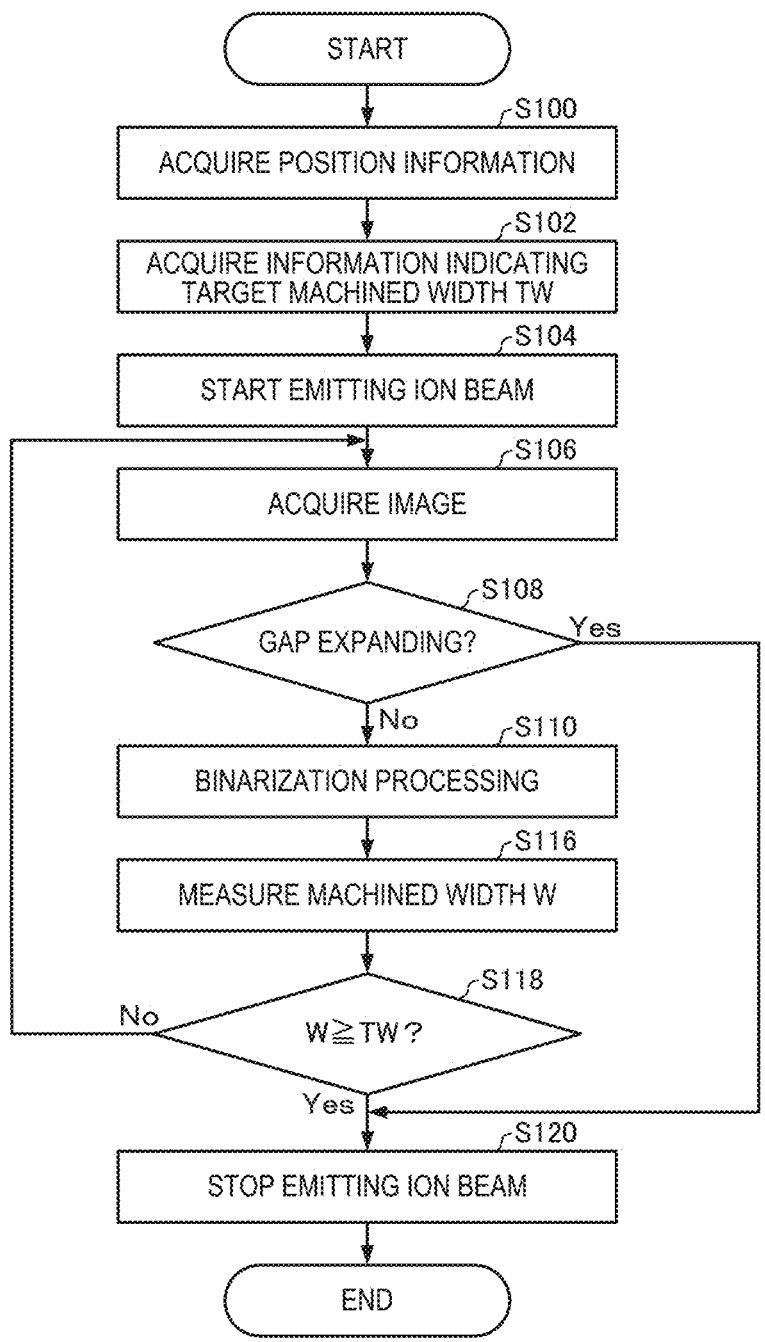
FIG. 29 is a flowchart illustrating an example of specimen machining processing.

FIG. 29 is a flowchart illustrating an example of specimen machining processing performed by the information processing device 70 in the specimen machining device 200.

As illustrated in FIG. 29, with the specimen machining device 200, the processing differs from the primary milling processing illustrated in FIG. 9 in that the processing S112 for determining whether or not the number of aggregates is two and the processing S114 for calculating approximate straight lines corresponding to the edges of the aggregates are not performed. Further, with the specimen machining device 200, the processing S116 for measuring the machined width W is different.

Figure 30:
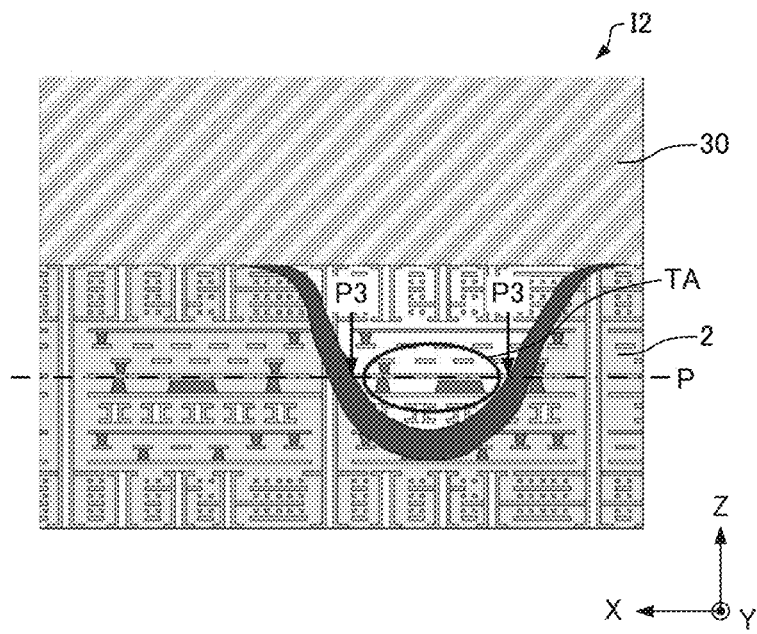
FIG. 30 illustrates processing for measuring a machined width.

FIG. 30 illustrates the processing S116 for measuring the machined width W in the specimen machining device 200.

As illustrated in FIG. 30, the machined width W is measured from positions P3 on the inside edges of the aggregate (the inclined surface 3). The position P3 is the position of a point where a straight line representing the position P in which to measure the machined width W intersects the inside edge of the aggregate. As illustrated in FIG. 30, as the machining progresses, two points occur where the straight line representing the position P in which to measure the machined width W intersects the inside edges of the aggregate, and the distance between the positions P3 of these two points serves as the machined width W. The information processing device 70 measures the machined width W by measuring the distance between the positions P3.

Figure 31:
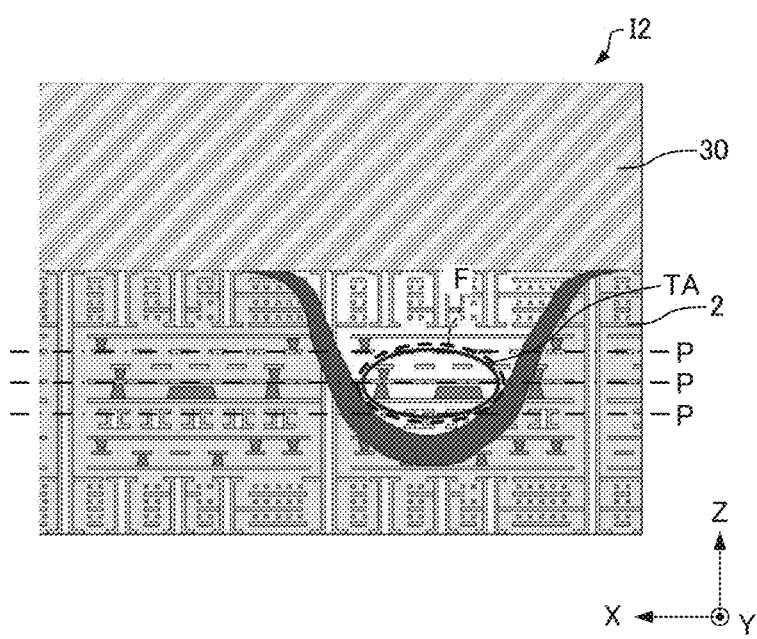
FIG. 31 illustrates a modified example of a method for setting a position in which to measure a machined width.

FIG. 31 illustrates a modified example of the method for setting the position P in which to measure the machined width.

As illustrated in FIG. 31, the position in which to measure the machined width W may be specified using a frame F for specifying the machining region TA. In the example in the figure, the shape of the frame F is elliptical, but there are no particular limitations on the shape of the frame F, and a rectangular or circular frame may be used. For example, when the machined width W is specified using the frame F, the information processing device 70 sets a plurality of positions P in which to measure the machined width W within the frame F. Then, when all of the machined widths W measured in the plurality of positions P equal or exceed the target machined width TW, the information processing device 70 determines that the machining is to be terminated.

With the specimen machining device 200, similarly to the specimen machining device 100, the machined width W can be measured accurately, and as a result, the timing at which to terminate the machining can be determined accurately based on the machined width W.

The invention is not limited to the above-described embodiments, and various modifications can be made. For example, the invention includes configurations that are substantially the same as the configurations described in the embodiments. Substantially same configurations mean configurations having the same functions, methods and results, or configurations having the same objectives and effects as those of the configurations described in the embodiments, for example. The invention also includes configurations obtained by replacing non-essential elements of the configurations described in the embodiments with other elements. The invention also includes configurations having the same effects as those of the configurations described in the embodiments, or configurations capable of achieving the same objectives as those of the configurations described in the embodiments. The invention further includes configurations obtained by adding known art to the configurations described in the embodiments.

Some embodiments of the invention have been described in detail above, but a person skilled in the art will readily appreciate that various modifications can be made from the embodiments without materially departing from the novel teachings and effects of the invention. Accordingly, all such modifications are assumed to be included in the scope of the invention.

What is claimed is:

1. A specimen machining device for machining a specimen by irradiating the specimen with an ion beam, the specimen machining device comprising:
   an ion source for irradiating the specimen with the ion beam;
   a shielding member disposed on the specimen to block the ion beam;
   a specimen stage for holding the specimen;
   a camera for photographing the specimen;
   a coaxial illumination device for irradiating the specimen with illumination light along an optical axis of the camera;
   a transmission illumination device for transmissively illuminating the specimen; and
   a processing unit for determining whether to terminate the machining based on an image photographed by the camera,
   the processing unit configured to perform processing for:
      acquiring information indicating a target machined width;
      acquiring the image;
      extracting from the image two inclined surfaces formed by the machining based on a dark appearance of the two inclined surfaces in the image due to the coaxial illumination;
      measuring a machined width on the acquired image, the machined width being a distance in a direction perpendicular to both the ion beam and the illumination light, between the two inclined surfaces; and
      terminating the machining when the measured machined width equals or exceeds the target machined width,
   wherein each of the inclined surfaces is formed in a boundary between a machined region of the specimen and an unmachined region of the specimen.

2. The specimen machining device according to claim 1, wherein, during the processing for measuring the machined width, the processing unit generates a binarized image by binarizing the image, and measures the machined width on the binarized image.

3. The specimen machining device according to claim 2, wherein, during the processing for measuring the machined width, the processing unit extracts an inclined surface formed by the machining, by binarizing the image, determines whether a number of the extracted inclined surface is two, and when the number of the inclined surface is two, measures the machined width by measuring a distance between the two inclined surfaces.

4. The specimen machining device according to claim 1, wherein the camera photographs the specimen while the specimen is illuminated by coaxial illumination and transmission illumination.

5. The specimen machining device according to claim 1, wherein the processing unit performs processing for predicting a completion time of the machining based on a measurement result of the machined width.

6. The specimen machining device according to claim 1, wherein
   the specimen stage includes a swing mechanism for swinging the specimen, and
   during the processing for acquiring the image, the processing unit acquires the image photographed by the camera at a timing when the specimen is horizontal.

7. A specimen machining method using a specimen machining device for machining a specimen by irradiating the specimen with an ion beam, the specimen machining method comprising:
   irradiating the specimen with the ion beam from an ion source;
   blocking the ion beam with a shielding member disposed on the specimen;
   acquiring information indicating a target machined width;
   acquiring an image of the specimen by illuminating the specimen using coaxial illumination light along the optical axis of a camera and by a transmission illumination device for transmissively illuminating the specimen; and photographing the specimen;
   extracting from the image two inclined surfaces formed by the machining based on a dark appearance of the two inclined surfaces in the image due to the coaxial illumination;
   measuring a machined width on the acquired image, the machined width being a distance in a direction perpendicular to both the ion beam and the illumination light, between two inclined surfaces formed by the machining; and
   terminating the machining when the measured machined width equals or exceeds the target machined width,
   wherein each of the inclined surfaces is formed in a boundary between a machined region of the specimen and an unmachined region of the specimen.

8. The specimen machining device according to claim 1, wherein
   the specimen stage comprises an inverting mechanism for turning the specimen upside down.

9. The specimen machining method according to claim 7, further comprising:
   turning the specimen upside down after terminating the machining;
   removing the shielding member from the specimen; and
   irradiating the specimen with the ion beam after turning the specimen upside down and removing the shielding member from the specimen.

* * * * *